US012699791B2

(12) United States Patent
Fiala et al.

(10) Patent No.: US 12,699,791 B2
(45) Date of Patent: Aug. 4, 2026

(54) APPARATUSES, COMPUTER-IMPLEMENTED METHODS, AND COMPUTER PROGRAM PRODUCTS FOR IMPROVED SERIALIZATION VALIDATION IN A TRUST NETWORK

(71) Applicant: Honeywell International Inc., Charlotte, NC (US)

(72) Inventors: Garrick Joseph Fiala, Seminole, FL (US); Varun Shekhar Singh, Gandhinager (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 654 days.

(21) Appl. No.: 18/184,315

(22) Filed: Mar. 15, 2023

(65) Prior Publication Data

US 2024/0086560 A1 Mar. 14, 2024

(30) Foreign Application Priority Data

Sep. 14, 2022 (IN) .............................. 202211052498

(51) Int. Cl.
G06F 21/62 (2013.01)

(52) U.S. Cl.
CPC ................................ G06F 21/6218 (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 9,672,458 B2 * | 6/2017 | Burkhart | ........... | G06Q 30/0639 |
| 10,140,473 B2 * | 11/2018 | Johnson | ................ | G06F 21/604 |
| 10,552,846 B2 * | 2/2020 | Caton | ................. | G06Q 30/018 |
| 10,936,745 B2 * | 3/2021 | Jain | ..................... | G06F 21/6227 |
| 2002/0012445 A1 | 1/2002 | Perry | | |
| 2013/0179676 A1 * | 7/2013 | Hamid | ................. | G06F 21/335 |
| | | | | 713/150 |

(Continued)

OTHER PUBLICATIONS

Extended European Search Report Mailed on Oct. 25, 2023 for EP Application No. 23193501, 8 page(s).

*Primary Examiner* — Gary S Gracia

(74) *Attorney, Agent, or Firm* — ALSTON & BIRD LLP

(57) ABSTRACT

Embodiments of the present disclosure provide for improved methodologies of generating and using serialized symbologies. Embodiments store object information associated with a unique serialized symbology and provide access to a serialization processing portal. The serialization processing portal enables access to an end user device for performing a validation of a particular scan of a captured symbology, and providing validation information at least indicating whether the validation was successful. In some embodiments the validation information includes object information regarding one or more physical characteristic(s) of the actual object linked to or otherwise associated with the symbology, such that a user may determine and/or indicate whether an unvalidated object in possession by an end user matches the physical characteristics of the object linked to the symbology. Some embodiments enable generation of the unique serialized symbology via the serialization processing portal for pushing to a trust database for use in subsequent validation(s).

19 Claims, 13 Drawing Sheets

(56) References Cited

U.S. PATENT DOCUMENTS

| | | | | |
|---|---|---|---|---|
| 2015/0041530 | A1* | 2/2015 | Burkhart | G06K 7/1404 |
| | | | | 235/494 |
| 2015/0076218 | A1* | 3/2015 | Wood | G06Q 30/0185 |
| | | | | 235/375 |
| 2016/0071319 | A1* | 3/2016 | Fallon | G09G 5/003 |
| | | | | 345/633 |
| 2018/0129817 | A1* | 5/2018 | Burge | G06F 21/6218 |
| 2020/0357002 | A1* | 11/2020 | Caton | G06F 21/36 |
| 2021/0103934 | A1* | 4/2021 | Ha | G06Q 30/016 |
| 2021/0313069 | A1* | 10/2021 | Williams | G16H 50/30 |
| 2024/0048547 | A1* | 2/2024 | Badr | H04L 63/0823 |
| 2024/0086560 | A1* | 3/2024 | Fiala | G06F 21/6218 |
| 2024/0320217 | A1* | 9/2024 | Goyal | G06F 16/24544 |
| 2025/0061228 | A1* | 2/2025 | Cameron | G06F 21/6245 |
| 2025/0184322 | A1* | 6/2025 | Bansal | H04L 63/083 |

* cited by examiner

APPARATUSES, COMPUTER-IMPLEMENTED METHODS, AND COMPUTER PROGRAM PRODUCTS FOR IMPROVED SERIALIZATION VALIDATION IN A TRUST NETWORK

CROSS-REFERENCE TO RELATED APPLICATIONS

This application claims priority to and the benefit of foreign Indian Provisional Patent Application Serial No. 202211052498, filed on Sep. 14, 2022 with the Government of India Patent Office and entitled "APPARATUSES, COMPUTER-IMPLEMENTED METHODS, AND COMPUTER PROGRAM PRODUCTS FOR IMPROVED SERIALIZATION VALIDATION IN A TRUST NETWORK," the contents of each of which are incorporated herein by reference in their entireties.

TECHNOLOGICAL FIELD

Embodiments of the present disclosure generally relate to secure validation of serialized machine-readable symbologies and object(s) associated with the symbology, and specifically to improved serialization validation using a trust network and/or generation unique serialized symbology/symbologies for authentication.

BACKGROUND

Often, serialized codes, such as barcodes, QR codes, or the like, are assigned to and/or otherwise linked with particular product(s). The codes are often assigned on an individual product level, and may be used by a manufacturer or other handler of such products for various tracking purposes. Such serialized codes rarely if ever serve a purpose for an end user, with no way for a user to validate such information and/or association with a particular object Applicant has discovered problems with current implementations of generation and use of serialized codes. Through applied effort, ingenuity, and innovation, Applicant has solved many of these identified problems by developing embodied in the present disclosure, which are described in detail below.

BRIEF SUMMARY

In general, embodiments of the present disclosure are provided for serialization validation in a trust network. Other implementations for serialization validation in a trust network will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for providing serialization validation in a trust network is provided. The computer-implemented method is performable via one or more computer(s) embodied in hardware, software, firmware, or any combination thereof as described herein. In one example implementation of the computer-implemented method, the example computer-implemented method includes storing object information in a trust database, where the object information includes at least a unique object-linked identifier associated with a unique serialized symbology. The example computer-implemented method further includes receiving, from an end user device and via a serialization processing portal, an indication of a scan of a captured symbology. The example computer-implemented method further includes automatically performing a validation of the scan of the captured symbology utilizing at least the trust database, where the validation at least determines whether the captured symbology represents the unique serialized symbology. The example computer-implemented method filthier includes providing, to the end user device, at least validation information indicating whether the validation was successful.

Additionally or alternatively, in some embodiments of the computer-implemented method, the computer-implemented method further includes generating the unique serialized symbology associated with a particular security level, where the unique serialized symbology represents the unique object-linked identifier, where the unique serialized symbology is associated with the object information including the unique object-linked identifier, where the unique serialized symbology is configured to trigger access to the serialization processing portal upon being scanned, and pushing the object information to the trust database in response to generation of the unique serialized symbology.

Additionally or alternatively, in some embodiments of the computer-implemented method, the computer-implemented method further includes maintaining a plurality of user identifiers associated with a plurality of manufacturing locations that are associated with manufacturing of an object associated with the unique object-linked identifier, receiving a request to generate the unique serialized symbology, the request associated with a particular user identifier of the plurality of identifiers, where the particular user identifier is utilized to generate the unique object-linked identifier or the object information associated with the unique serialized symbology.

Additionally or alternatively, in some embodiments of the computer-implemented method, the computer-implemented method further includes providing the unique serialized symbology to a system, wherein providing the unique serialized symbology cause the system to print the unique serialized symbology on a first object or on a second object affixed to the first object.

Additionally or alternatively, in some embodiments of the computer-implemented method, the computer-implemented method further includes automatically retrieving, from the trust database and via the serialization processing portal, the object information corresponding to the unique serialized symbology in response to successfully validating the scan, and outputting at least the object information to the end user device.

Additionally or alternatively, in some embodiments of the computer-implemented method, the object information corresponding to the unique serialized symbology comprises an image of an object to which the unique serialized symbology is linked.

Additionally or alternatively, in some embodiments of the computer-implemented method, the unique serialized symbology embodies a nested symbology that comprising a first symbology representing data utilized to access the serialization processing portal and a second symbology representing a scanned identifier associated with the scanned symbology, where the scanned identifier is transmitted to the serialization processing portal.

Additionally or alternatively, in some embodiments of the computer-implemented method, the computer-implemented method further includes receiving, via the end user device, user-provided information indicating whether an object in possession by a user of the end user device matches the object information provided associated with the unique serialized symbology, and storing a counterfeit indication based at least in part on the user-provided information.

Additionally or alternatively, in some embodiments of the computer-implemented method, the computer-implemented method further includes in a circumstance where the validation of the scan indicates a counterfeit object instance, generating aggregated data based at least in part on trust network data associated with the scan, the aggregated data associated with at least one data value indicating the scan is associated with a counterfeit object instance. Additionally or alternatively, in some such embodiments of the computer-implemented method, the computer-implemented method further includes causing rendering, via the serialization processing portal, of the aggregated data to a trusted symbology user device associated with at least the counterfeit object instance.

Additionally or alternatively, in some embodiments of the computer-implemented method, the computer-implemented method further includes generating at least one additional information request in response to detecting that the scan is associated with the counterfeit object, and causing rendering of the at least one additional information request to the end user device.

Additionally or alternatively, in some embodiments of the computer-implemented method, the computer-implemented method further includes in a circumstance where the validation of the scan indicates an validated object instance of, generating aggregated data based at least in part on trust network data associated with the scan, the aggregated data associated with at least one data value indicating the scan is associated with the validated object instance. Additionally or alternatively, in some such embodiments of the computer-implemented method, the computer-implemented method further includes causing rendering, via the serialization processing portal, of the aggregated data to a trusted symbology user device associated with at least the validated object instance.

Additionally or alternatively, in some embodiments of the computer-implemented method, the unique serialized symbology is associated with a particular security level selected from a plurality of candidate security levels, where the validation of the scan is based at least in part on the particular security level, and where the unique serialized symbology includes additional authentication elements for each higher-level security level of the plurality of candidate security levels. Additionally or alternatively, in some such embodiments of the computer-implemented method, the plurality of candidate security levels includes (1) a first security level associated with a first symbology implementation, (2) a second security level associated with a second symbology implementation comprising at least one first additional authentication element not present in the first symbology implementation, wherein the at least one first additional element comprises a customized code design, and (3) a third security level associated with a third symbology implementation comprising at least one second additional authentication element not present in the first symbology implementation and not present in the second symbology implementation, wherein the at least one second additional authentication element comprises a custom packaging authentication element.

Additionally or alternatively, in some embodiments of the computer-implemented method, the unique serialized symbology is scannable using a camera application installed on the end user device, where the camera application is distinct from a user-facing application corresponding to the serialization processing portal.

Additionally or alternatively, in some embodiments of the computer-implemented method, the computer-implemented method further includes the unique serialized symbology is scannable using a user-facing application corresponding to the serialized processing portal, where the user-facing application is installed on the end user device during scanning.

BRIEF DESCRIPTION OF THE DRAWINGS

Figure 1:
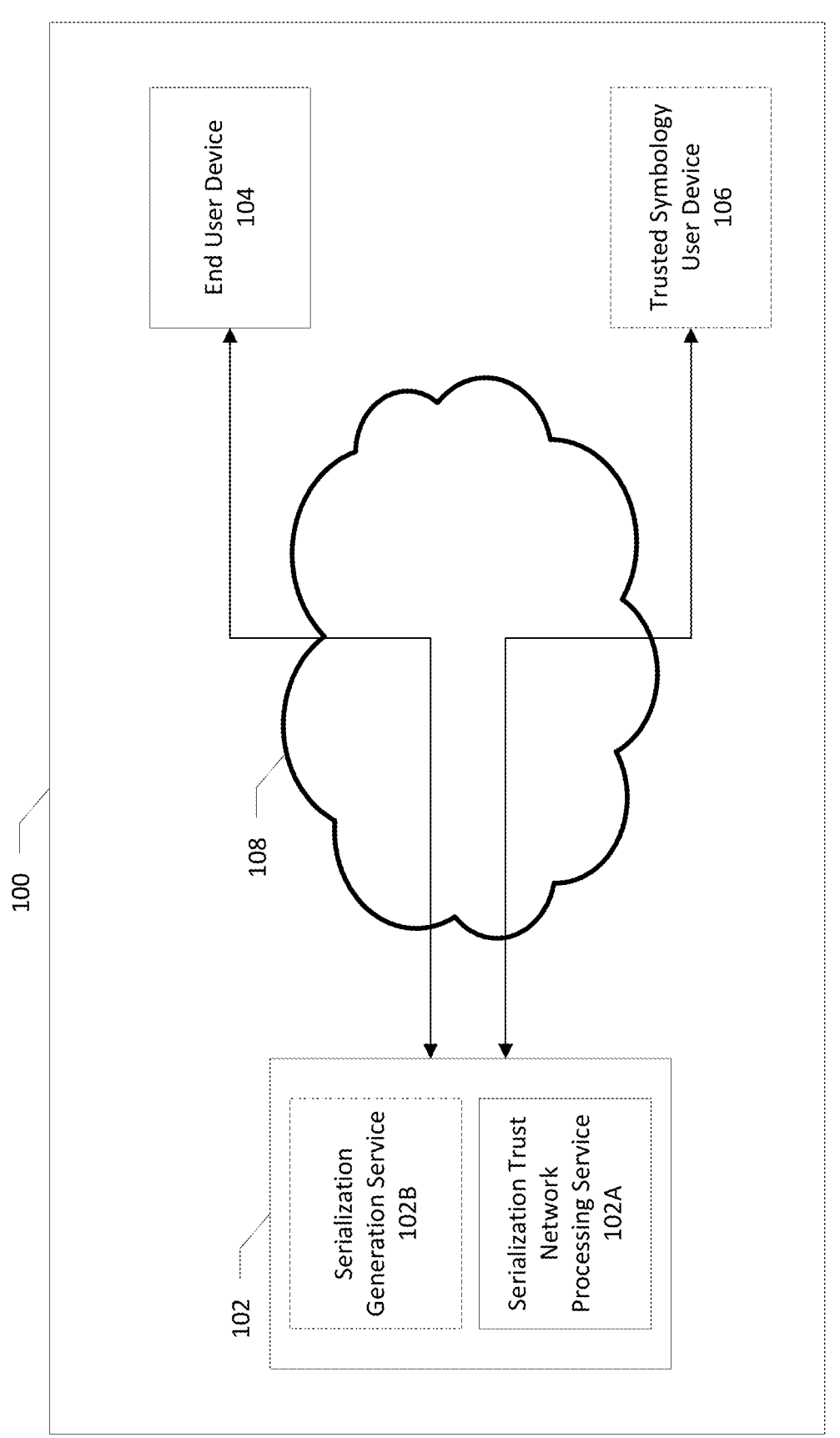
Figure 2:
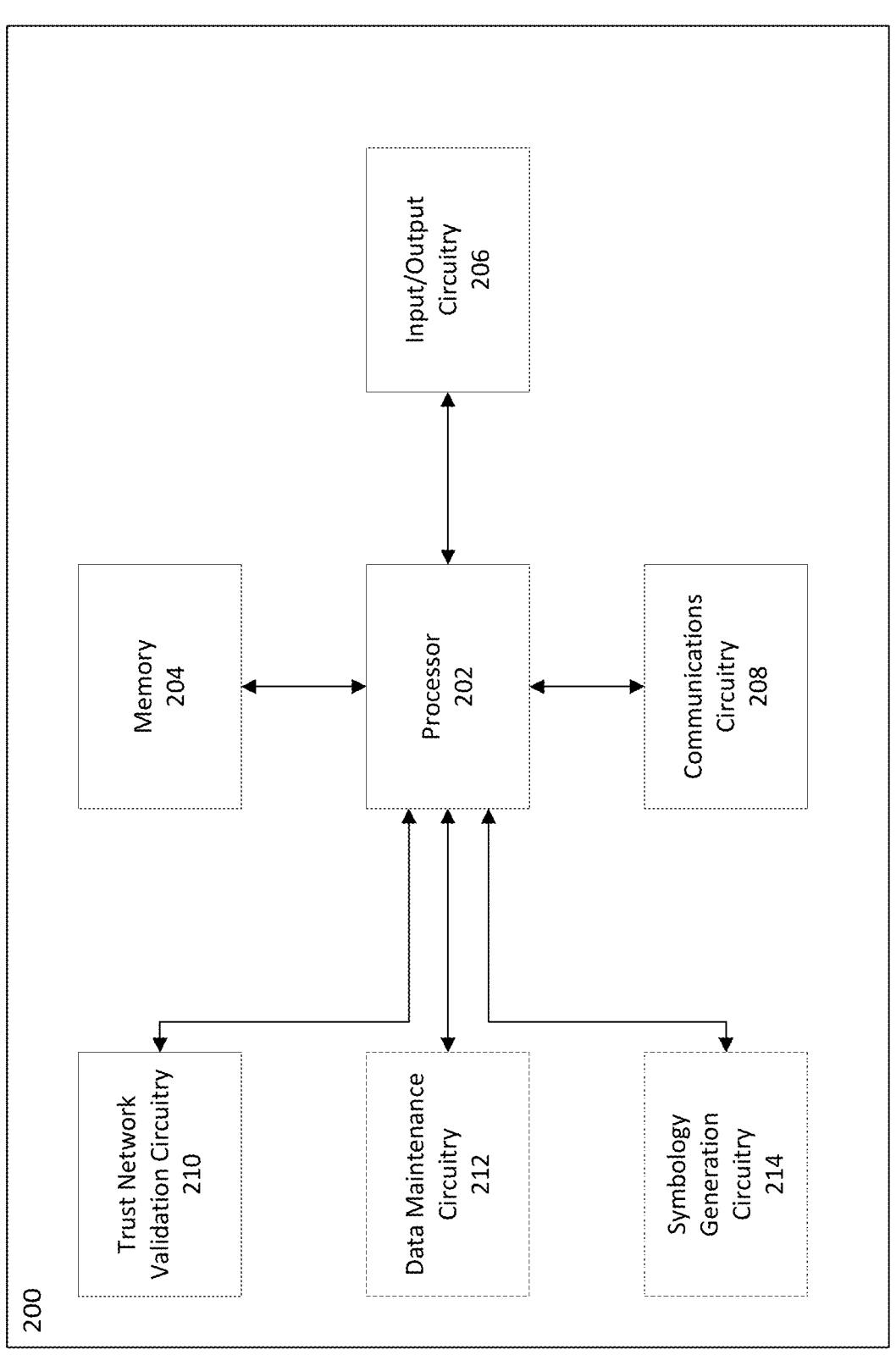
Figure 3:
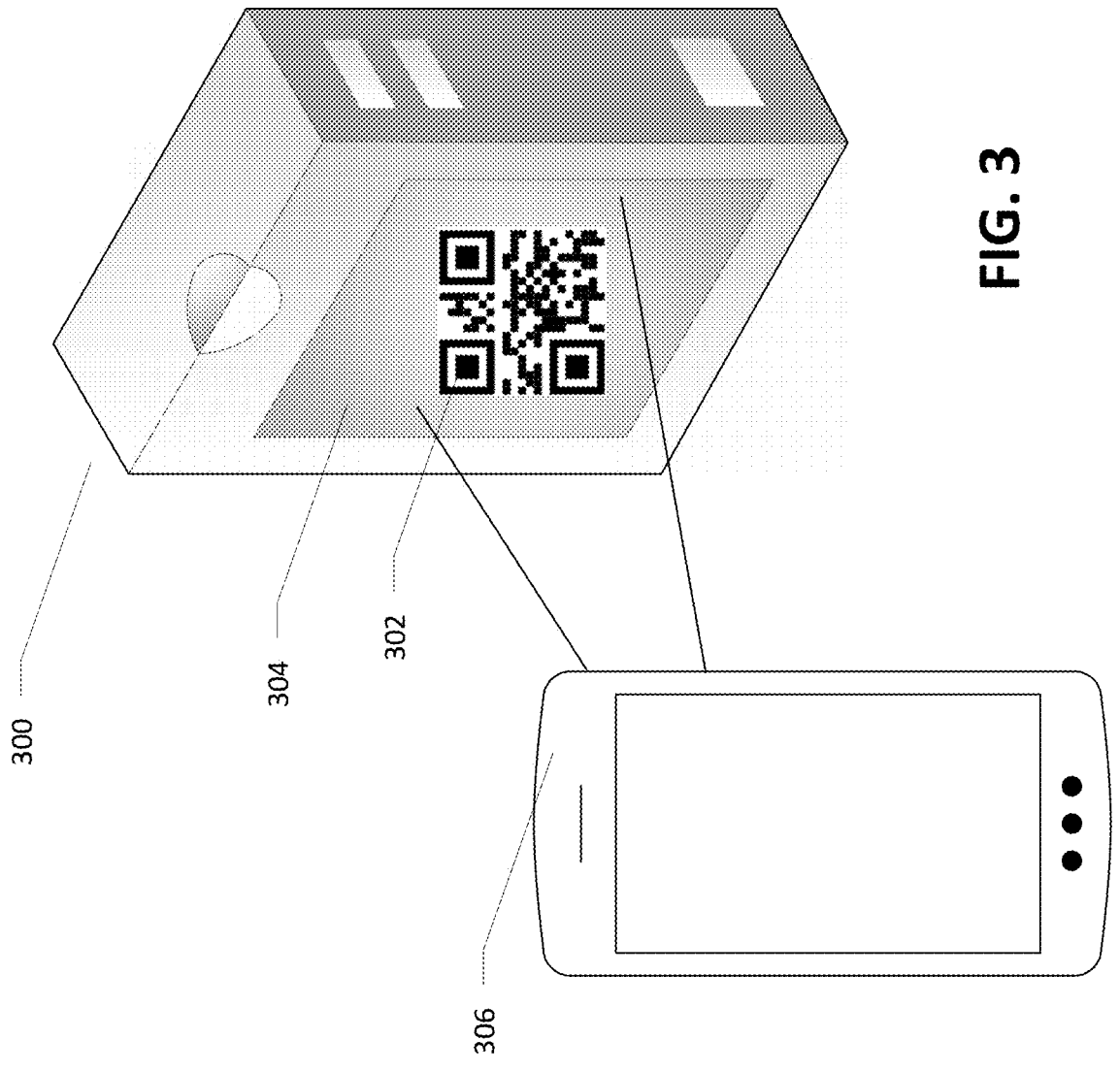
Figure 4:
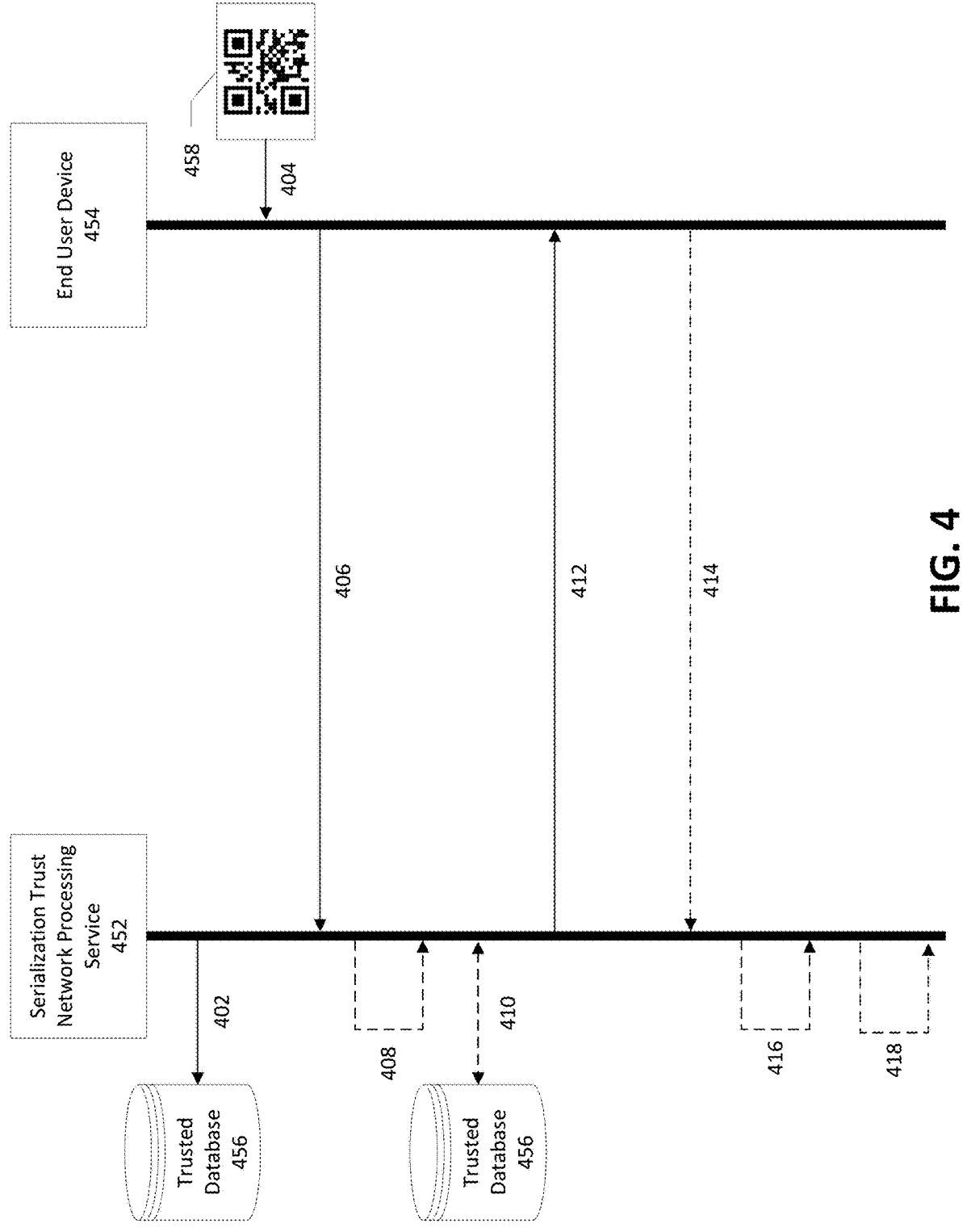
Figure 5:
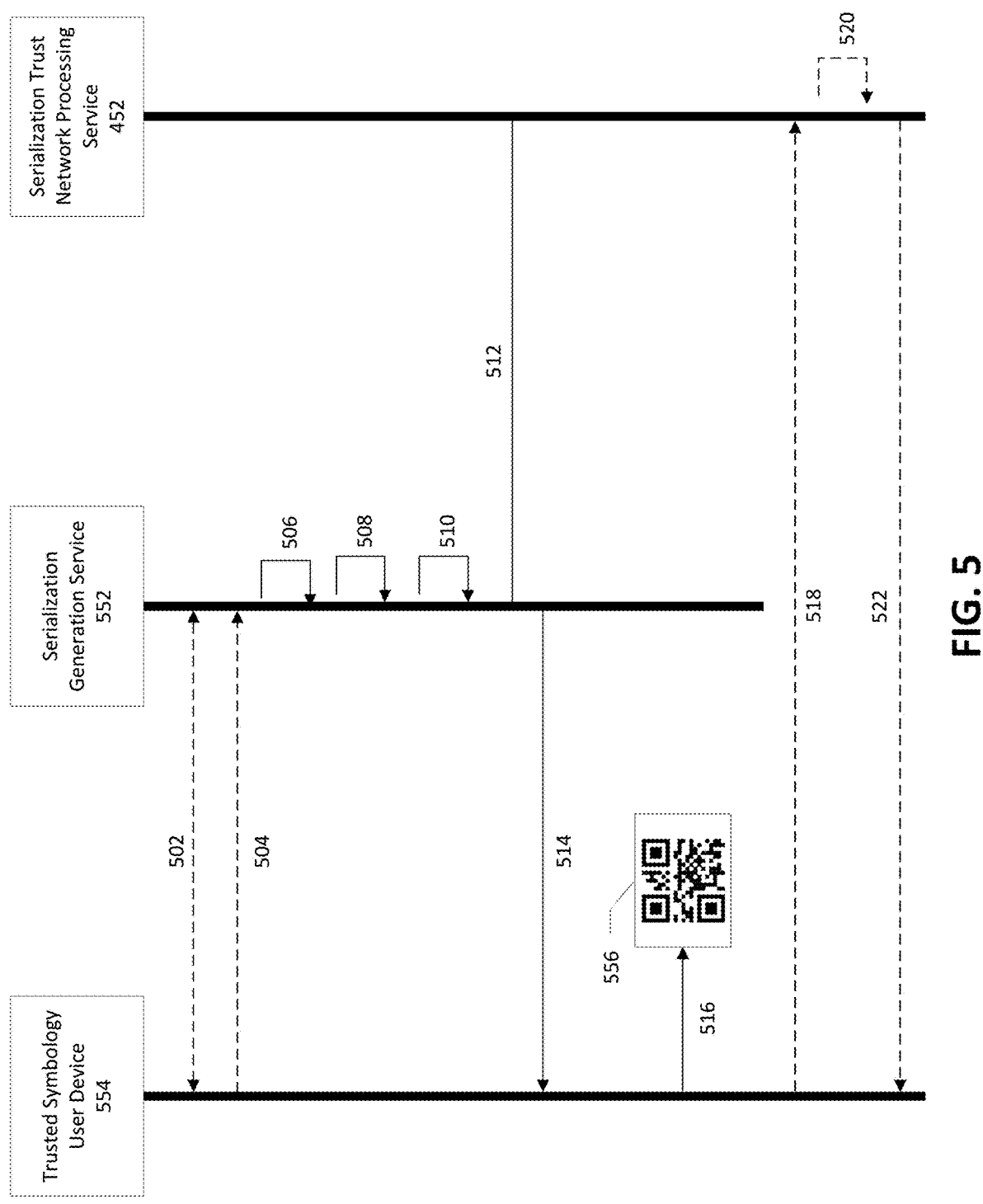
Figure 6:
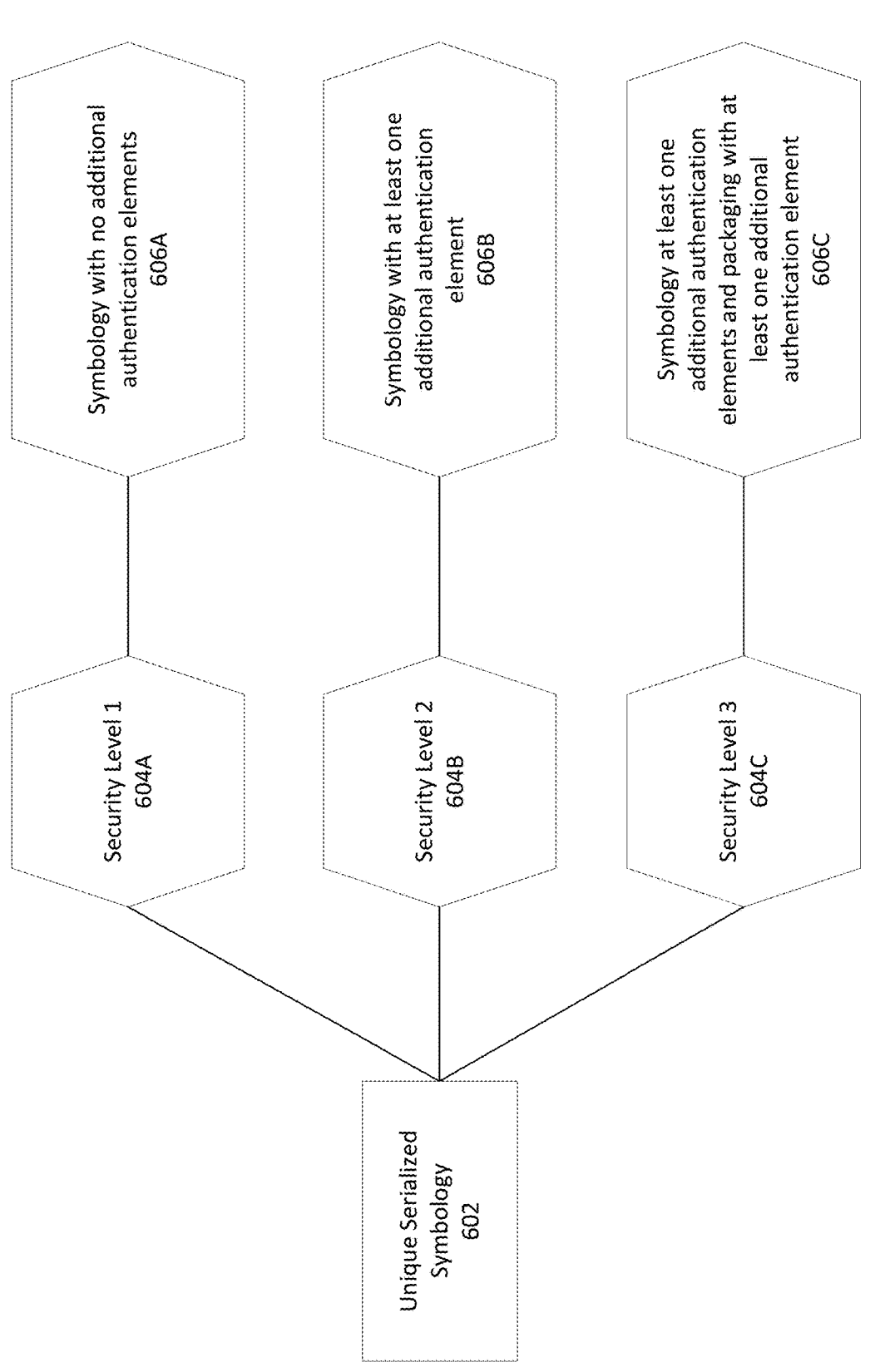
Figure 7:
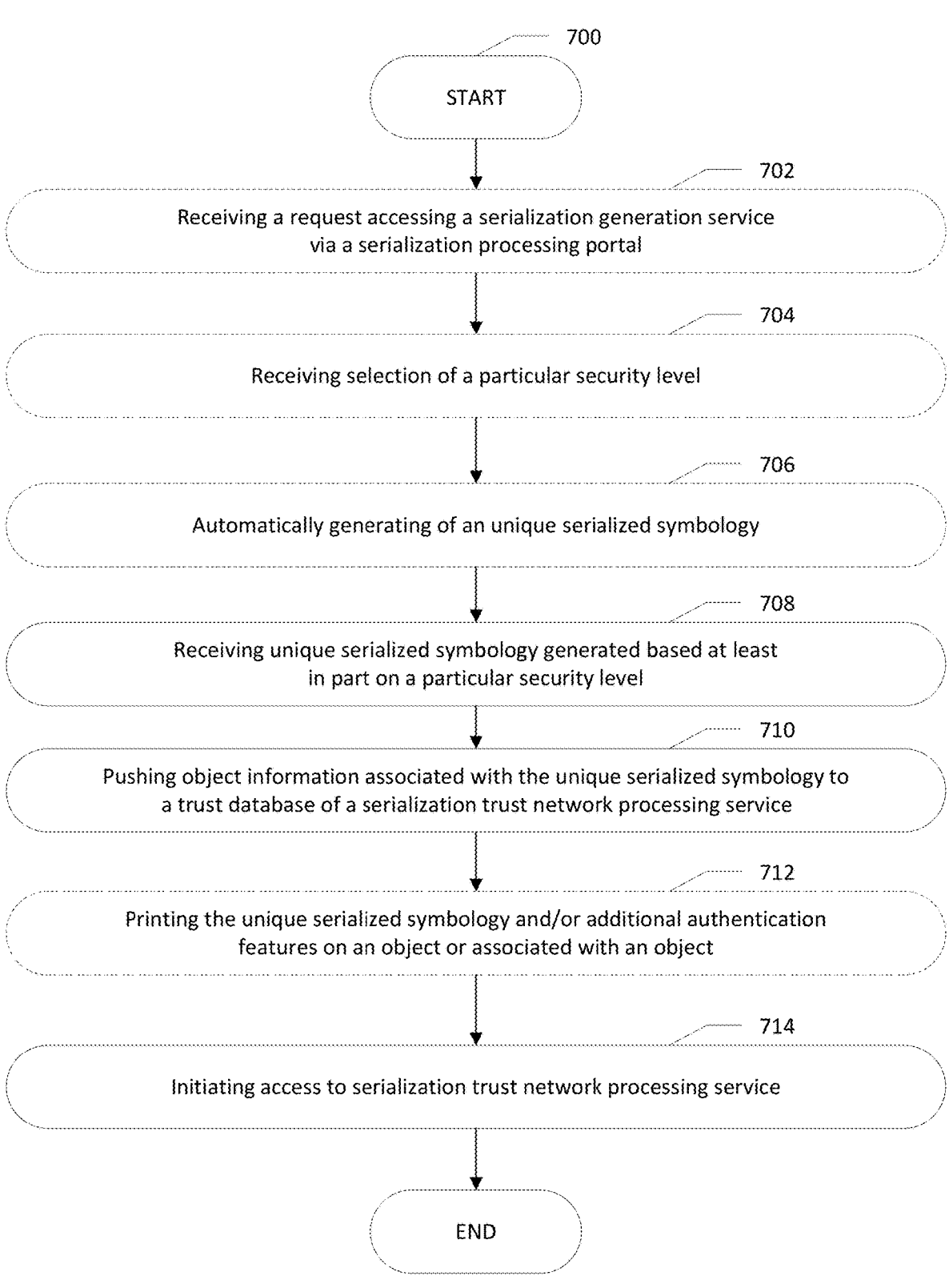
Figure 8:
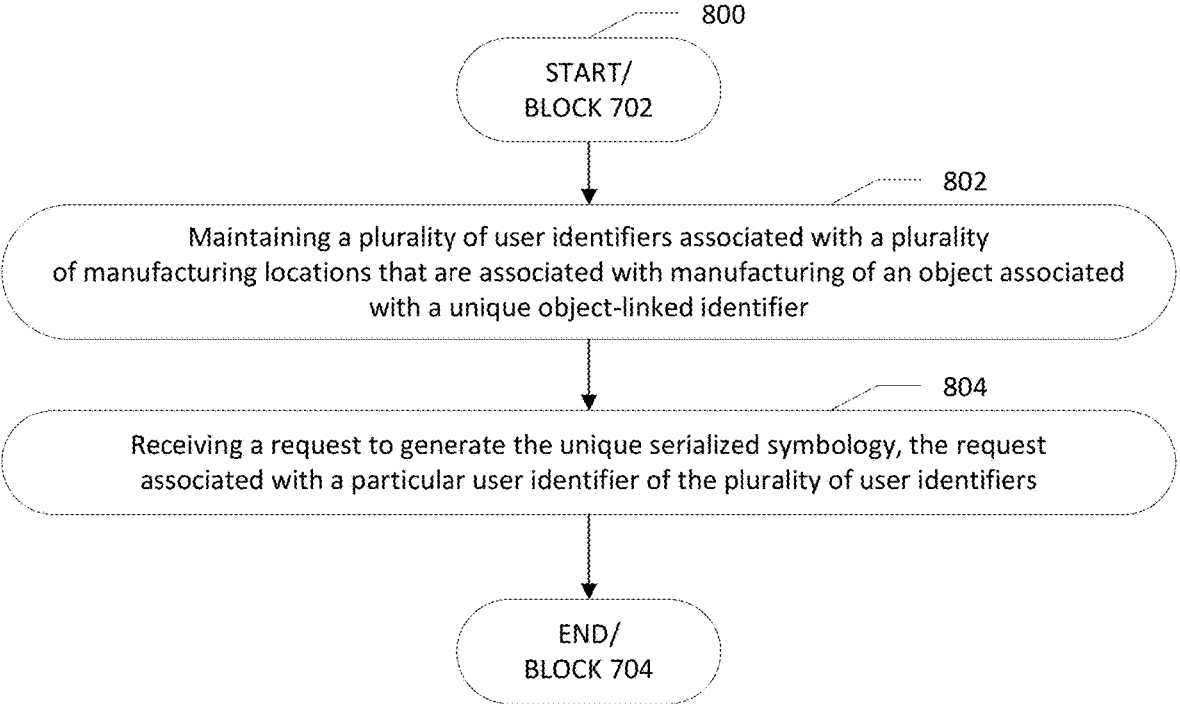
Figure 9:
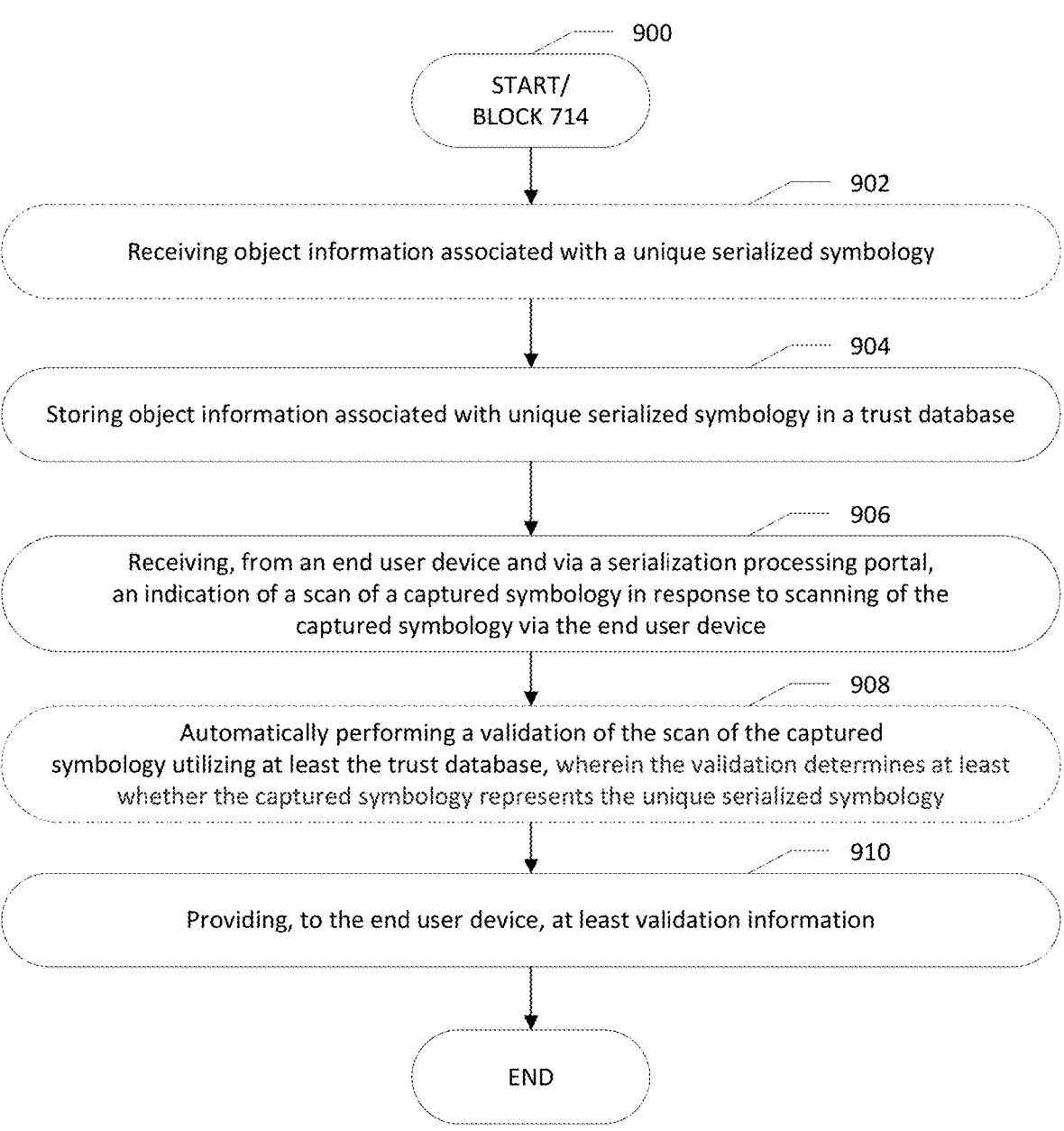
Figure 10:
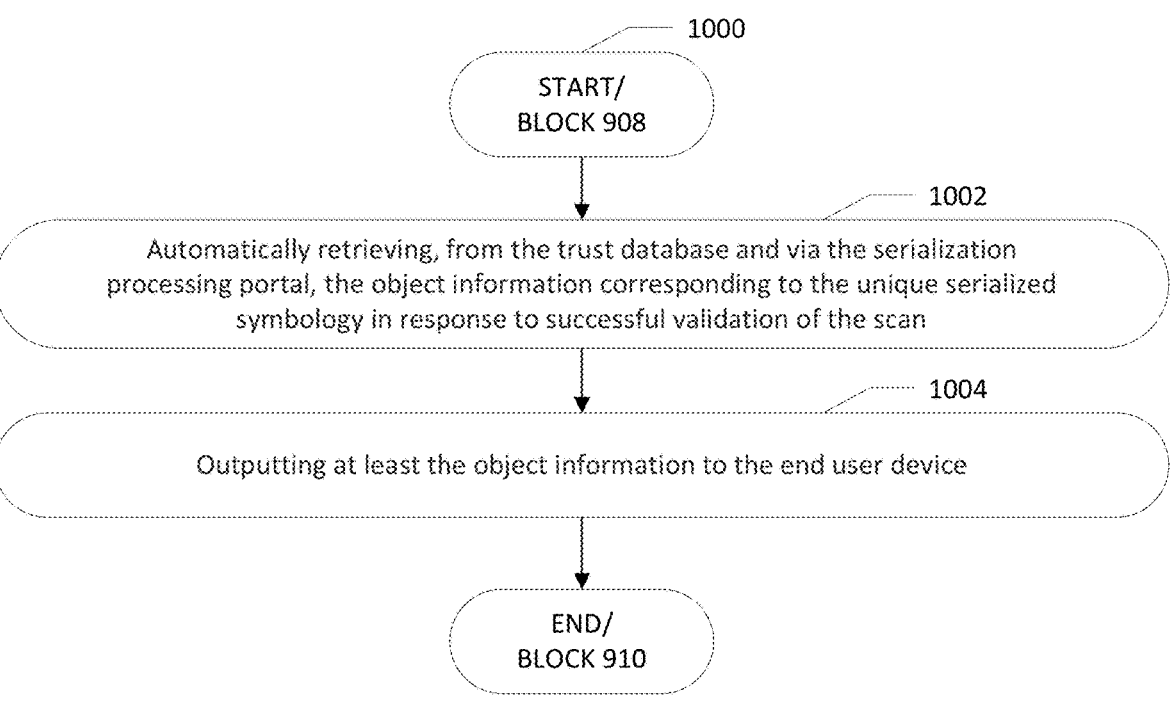
Figure 11:
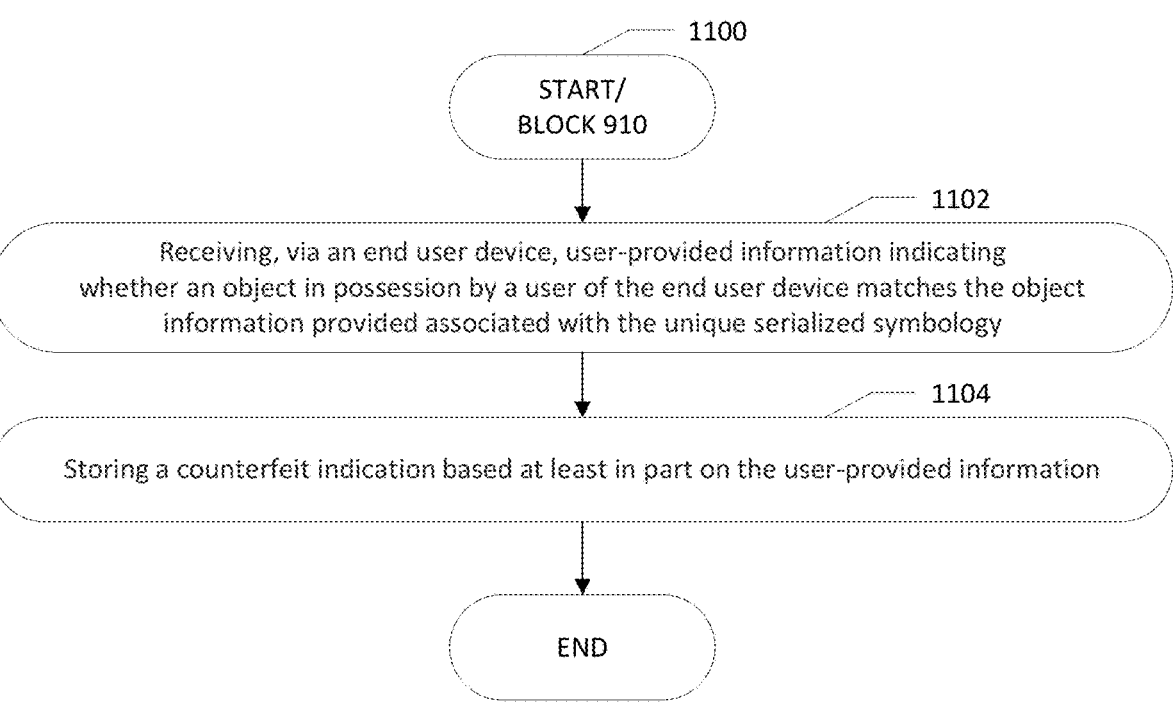
Figure 12:
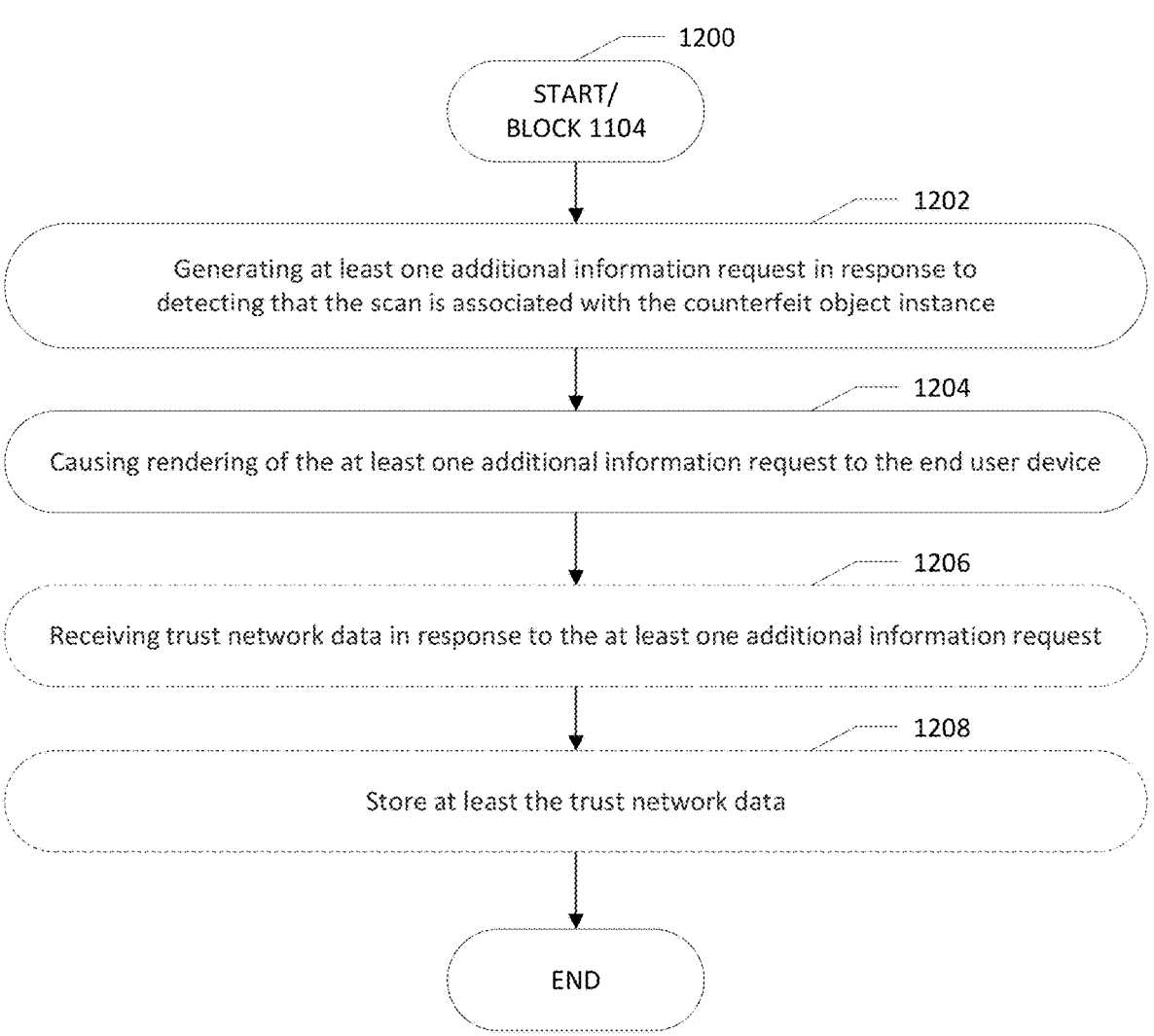
Figure 13:
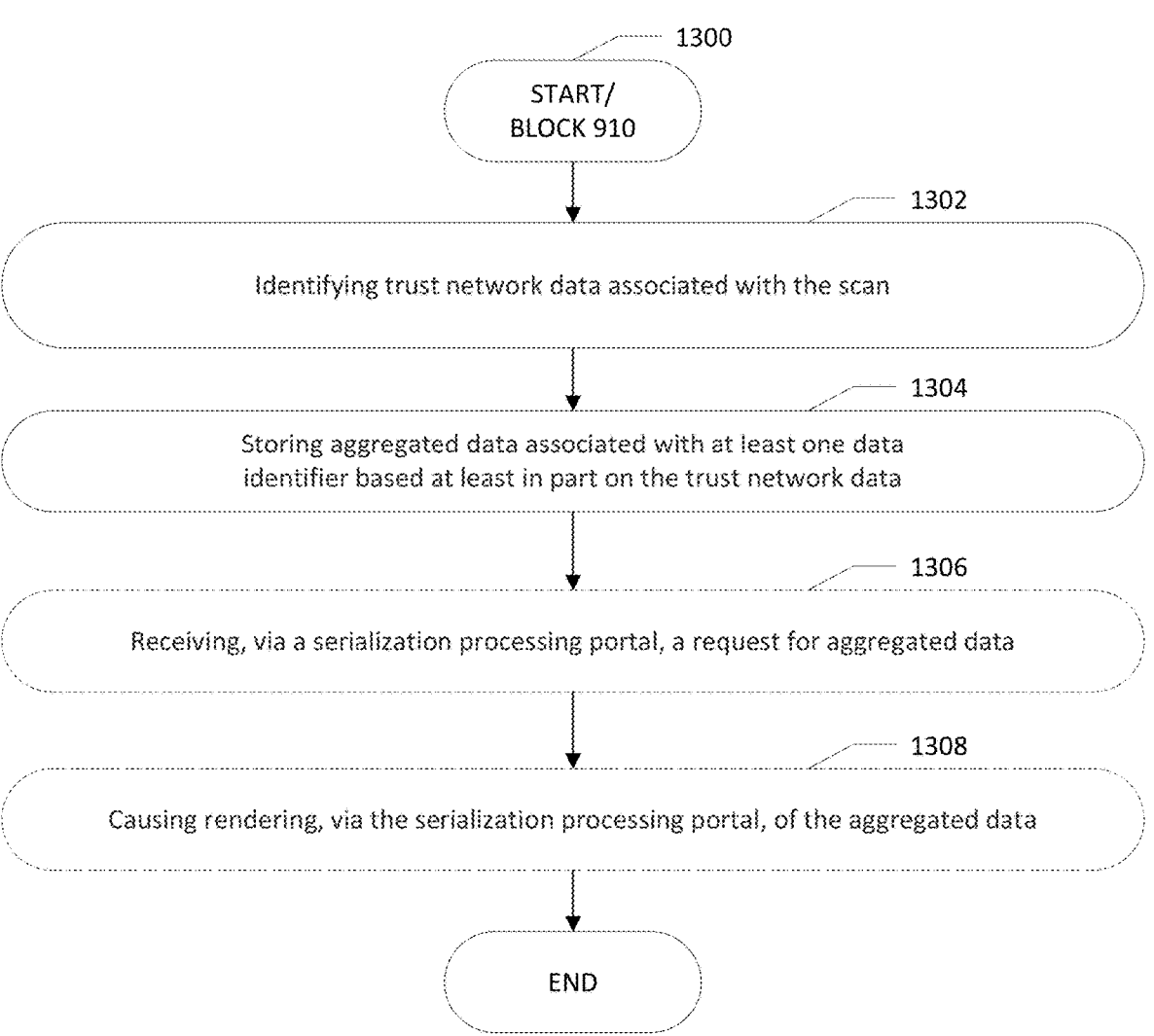

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3 illustrates an example visualization of association between a unique serialized symbology and related authentication elements with a particular object for validation in accordance with at least an example embodiment of the present disclosure;

FIG. 4 illustrates an example data flow for performing serialization validation of a scanned code in a trust network in accordance with at least an example embodiment of the present disclosure;

FIG. 5 illustrates an example data flow for performing unique serialized symbology generation for use in a trust network in accordance with at least an example embodiment of the present disclosure;

FIG. 6 illustrates an example visualization of different elements of unique serialized symbologies associated with different security levels in accordance with at least an example embodiment of the present disclosure;

FIG. 7 illustrates a data flow depicting example operations of a process for generating a unique serialized symbology for use in a trust network in accordance with at least an example embodiment of the present disclosure;

FIG. 8 illustrates a data flow depicting example operations of a process for generating a unique serialized symbology based at least in part on a user identifier in accordance with at least an example embodiment of the present disclosure;

FIG. 9 illustrates a data flow depicting example operations of a process for providing serialization validation in a trust network in accordance with at least an example embodiment of the present disclosure;

FIG. 10 illustrates a data flow depicting example operations of a process for outputting object information based at least in part on a scanned captured symbology in accordance with at least an example embodiment of the present disclosure;

FIG. 11 illustrates a data flow depicting example operations of a process for storing a counterfeit indication associated with a unique serialized symbology in accordance with at least an example embodiment of the present disclosure;

FIG. 12 illustrates a data flow depicting example operations of a process for causing rendering of additional information request(s) associated with a counterfeit object in accordance with at least an example embodiment of the present disclosure; and FIG. 13 illustrates a data flow depicting example operations of a process for storing and/or rendering aggregated data in accordance with at least an example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, it is desirable to utilize a serialized code—such as a machine-readable symbology—to retrieve and/or convey information associated with a particular object. In one example context, a machine-readable symbology is printed on a particular object, or packaging associated with a particular object. The machine-readable code may be scanned, for example to decode data represented therein that is associated with aspects or characteristics of the object, manufacture of the object, and/or the like, or to decode an identifier usable to retrieve such information (e.g., from a database). The data decoded from the machine-readable symbology may be utilized to validate authenticity of the particular object and/or aspects associated with the particular object (e.g., manufacturing information and/or a custody chain associated with the object).

Use of mere machine-readable symbology for such purposes, however, without more, suffers from a myriad of problems. Simple machine-readable symbology implementations associated with a particular object may readily be reproducible onto other inauthentic and/or counterfeit objects. Alternatively, such machine-readable symbologies may be transferred (e.g., on a tag, packing, and/or the like), to a counterfeit object instance with which the machine-readable symbology does not actually correspond. An end user (e.g., an individual or business entity transacting in the object) lacks a trusted system usable for validating authenticity of a machine-readable symbology associated with an object, and/or validating the authenticity of an object as an validated object instance associated with a particular machine-readable symbology.

Similarly, entities that produce and/or otherwise transact in objects lack a system to generate a machine-readable symbology trusted to authentically correspond to a particular object. Such entities lack an end-to-end solution for generating machine-readable symbologies that are trusted to be difficult to accurately copy and/or transfer to other objects, and that similarly can be utilized by end users to authenticate the machine-readable symbology and object associated with the machine-readable symbology. In this regard, the inventors have identified that such entities would benefit from an easy to utilize, end-to-end solution that enhances object authentication and counterfeit detection.

Embodiments of the present disclosure provide for serialization validation in a trust network. Specifically, embodiments of the present disclosure maintain a trust database that stores object information associated with a particular unique serialized symbology. In this regard, the unique serialized symbology may represent particular data identifier(s) and/or data value(s) corresponding to a particular object, such that the unique serialized symbology may be printed on or otherwise associated with the object. An end user may utilize the unique serialized symbology to access a serialization processing portal, for example by scanning the unique serialized symbology (or a captured symbology believed to be a unique serialized symbology) on the end user device of the end user. Via the serialization processing portal, the end user device may be used to transmit an indication of the scan of the captured symbology.

The serialization processing portal may be utilized by the end user for any of a myriad of validations. In some embodiments, the unique serialized symbology is processed to transmit one or more particular data identifier(s) and/or data value(s) that correspond to a particular object. Such data identifier(s) and/or data value(s) in some embodiments are utilized by the serialization processing portal to retrieve object information and/or the like associated with a particular object. The serialization processing portal may provide validation information, for example including such object information, to the end user device for displaying. In this regard, the end user may utilize such information to determine whether a particular object in possession by a user is validated as an validated object instance associated with the unique serialized symbology. The end user may then utilize such information to confirm differentiation between a counterfeit object instance and an validated object instance. Additionally or alternatively, in some embodiments, the serialization processing portal may perform validation of the authenticity of the unique serialized symbology itself, for example, to confirm that the authenticity of the unique serialized symbology itself.

Such embodiments embody a trust network that maintains data usable for any number of validations associated with object(s) and/or associated unique serialized symbologies. In some embodiments, the serialization processing portal further enables tracking of data associated with successful validation attempts and/or unsuccessful validation attempts. For example, data associated with each successfully validated scan of a unique serialized symbology associated with an validated object instance may be aggregated and tracked, such that a trusted user associated with generation and/or maintenance of the unique serialized symbology may view, interact with, and/or otherwise process such data. Similarly, in some embodiments, data associated with each unsuccessful validation of a particular object (e.g., as a counterfeit object instance) may be aggregated and tracked, and/or data associated with each unsuccessful validation of a captured symbology as a counterfeit of a unique serialized symbology may be aggregated and tracked, such that a trusted user may similarly view, interact with, and/or otherwise process such data. For example, the trusted user may utilize the same solution to track what objects are most authentically transferred, most attempted as counterfeits, and/or the like.

In some embodiments, an external system may be utilized to push previously-generated unique serialized symbologies to the trust database for use. Some other embodiments similarly provide the serialized processing portal for generation of a unique serialized symbology and pushing of the unique serialized symbology to a trust database for subsequent use in validation. In this regard, a trusted user may utilize the serialization processing portal to generate unique serialized symbologies corresponding to a particular object and/or access tracked data associated with each unique serialized symbology, while an end user may similarly utilize the serialization processing portal for validation(s) of a particular object in possession of an end user and/or validation of a captured symbology associated with an object in possession of the end user. In this regard, such embodiments provide an end-to-end solution for serialization, object validation, and the like for both trusted entities (e.g., manufacturers and/or the like that produce objects and/or protect authenticity of objects) and end users (e.g., consumers or entities that transact in objects).

Additionally or alternatively to immediate validation of a particular captured symbology, some embodiments of the present disclosure provide a trust network usable for any of a myriad of subsequent task(s). For example, in some embodiments, the trust network gathers particular data associated with each initiated scan for validation via the trust network. Such data may be aggregated and stored by the trust network in a trusted database. Some or all of such data may be granted access to other parties, shared between parties during particular system event(s) (e.g., at the time a scan occurs and/or is validated), and/or the like. In this regard, the data associated with a particular object, symbology, and/or the like may be maintained and utilized to generate and/or share robust analytics associated with a custody chain for a particular object, or multiple objects, which may correspond to a particular unique serialized symbology.

Definitions

The term "serialization validation" refers to a computer-implemented process for validating authenticity of a particular machine-readable symbology as a unique serialized symbology associated with a particular object.

The term "trust network" refers to one or more computing device(s), system(s), and/or connections between device(s), embodied in hardware, software, firmware, and/or a combination thereof, that store data associated with a unique serialized symbology and object corresponding to the unique serialized symbology, where such data is usable to validate authenticity of a particular machine-readable symbology as the unique serialized symbology and/or authenticity of a particular object in possession of a user as the actual object corresponding to the unique serialized symbology.

The term "object information" refers to electronically managed data that links an object with a particular unique serialized symbology, represents particular physical characteristics of the object, and/or represents information associated with the creation, transportation, and/or processing of the object.

The term "trust database" refers to one or more data storage device(s) embodied in hardware, software, firmware, and/or a combination thereof that stores data used for validating authenticity of a captured symbology as one or more previously-generated unique serialized symbology(s), and/or validating authenticity of an object as an authentic object associated with a particular unique serialized symbology.

The term "unique object-linked identifier" refers to a unique number, alphanumeric, or alphabetical identifier associated with a particular object and utilized to generate a particular unique serialized symbology.

The term "machine-readable symbology" refers to an image or visually encoded data representation that is detectable utilizing at least one computer-implemented image processing algorithm. A machine-readable symbology may be, but is not necessarily, detectable and/or decodable by a human viewer. Non-limiting examples of a machine-readable symbology includes a 1-dimensional code, a 2-dimensional code, a barcode, a quick response (QR) code, and a custom encoded image.

The term "unique serialized symbology" refers to a machine-readable symbology that uniquely corresponds to a particular object that is generated based at least in part on a unique object-linked identifier.

The term "symbology implementation" refers to a particular arrangements of visual elements that embody a particular implementation of a unique serialized symbology. For example, a black-and-white QR code may represent a first symbology implementation, and a color QR code may represent a second symbology implementation.

The term "customized code design" refers to a symbology implementation of a unique serialized symbology that includes one or more visual elements that is/are not part of a standard implementation of a machine-readable symbology corresponding to the unique serialized symbology.

The term "custom packaging authentication element" refers to one or more visual element(s) that accompany a unique serialized symbology on an external portion of an object or associated packaging, where the one or more visual element(s) is/are detectable and/or decodable as part of validating authenticity of the unique serialized symbology.

The term "security level" refers to electronically managed data that represents a particular difficulty of reproducing or otherwise copying a unique serialized symbology utilizing one or more authentication element(s).

The term "candidate security level" refers to a plurality of security levels selectable by a user for use in generating a unique serialized symbology with a particular level of difficulty in reproducing or otherwise copying.

The term "additional authentication element" refers to a separate or altered element of a machine-readable symbology that in combination embodies a unique serialized symbology and increases the difficulty to reproduce the resulting unique serialized symbology including such separate or altered element. Validation of a particular unique serialized symbology including one or more additional authentication element(s) in some embodiments requires validation of each of the one or more additional authentication element(s). A plurality of additional authentication elements may be associated with a single machine-readable symbology to generate a unique serialized symbology.

The term "higher-level security level" refers to an increased difficulty in reproduction of a first unique serialized symbology as compared to a second unique serialized symbology.

The term "end user device" refers to at least one computer embodied in hardware, software, firmware, and/or a combination thereof, and usable by an end user, that is configured for scanning of a captured symbology, accessing a serialization processing portal, and validating a scan of a captured symbology via the serialization processing portal.

The term "serialization processing portal" refers to a web-based application that is accessible to a user to at least initiate validation of a scan of a captured symbology to determine whether the captured symbology represents a particular unique serialized symbology.

The term "captured symbology" refers to an image representation of a machine-readable symbology captured by an end user device in a performed scan for validation.

The term "scan" refers to electronically manage data including image data captured by an end user device that is processed to attempt detecting and/or decoding of a machine-readable symbology represented therein. In some embodiments a scan is submitted to and/or transmitted to a serialization processing portal for processing.

The term "trust network data" refers to electronically managed data that embodies a content of a scan and/or metadata associated with capture, generation, transmission, and/or validation of the scan to a serialization processing portal. Non-limiting examples of trust network data include image content of a scan, a GPS location of an end user device that performed the scan, a timestamp at which the end user device captured the scan, a timestamp at which the end user device initiated transmission of the scan, a data value indicating whether validation of the scan was successful, a data value indicating, whether validation of an object associated with the scan was successful, a data identifier identifying a retail location at which an object associated with the scan was performed, network capabilities utilized to transmit to a portal, and other data determined based at least in part on software and/or hardware of a device that initiated a scan. Additionally or alternatively, in some embodiments, trust network data includes data indicating hardware and/or software characteristics of the end user device that performed the scan, including without limitation operating system data, processor type information, camera information, make/model information of the end user device, and browser information. Additionally or alternatively, in some embodiments, trust network data includes data associated with the user of the end user device, including without limitation age data, gender data, other biographical data, interest data, and other derived data.

The term "scanned identifier" refers to a numeric, alphanumeric, or alphabetic data identifier decoded from a captured symbology within a scan.

The term "validation" refers to a computer-implemented process that processes one or more visual elements of image data, data values detected and/or decoded from image data, and/or data submitted associated with image data, to determine authenticity of a particular captured symbology as representing a particular unique serialized symbology, and/or to determine authenticity of a particular object in possession associated with the captured symbology.

The term "successful" and "successfully completed" with respect to a validation refers to a state or status data indicating that all checks performed during the validation indicate authenticity.

The term "not successful" and "unsuccessfully completed" with respect to a validation refers to a state or status data indicating that all checks performed during the validation, or otherwise one or more checks performed, during the validation did not indicate authenticity.

The term "validation information" refers to electronically managed data indicating the results of a validation of a captured symbology as authentically representing a particular unique serialized symbology, and/or that includes data utilized in validating authenticity of an object in possession of a user as a particular validated object instance associated with the unique serialized symbology.

The term "user identifier" refers to electronically managed data that uniquely identifies a particular user or device accessing a serialization processing portal.

The term "manufacturing location" refers to data indicating a particular real-world location where a particular object was produced, assembled, or otherwise constructed.

The term "object" refers to any real-world item.

The term "request" refers to electronically managed data that indicates an invocation or attempted invocation of a particular computer-implemented process.

The term "manufacturing information" associated with an object refers to electronically managed data that represents any data relevant to, indicating, or otherwise associated with manufacture and/or transfer of the object.

The term "nested symbology" refers to a machine-readable symbology including at least a first machine-readable symbology embodying a sub-symbology depicted within, or together with, a second machine-readable symbology. In some embodiments, the first machine-readable symbology represents data for transmission to a particular serialization processing portal accessible via data represented by the second machine-readable symbology.

The term "object in possession" refers to an object physically in the control of or otherwise possessed by an end user of an end user device.

The term "counterfeit indication" refers to electronically managed data representing a determination that captured symbology is not an authentic instance of a unique serialized symbology, and/or a determination that an object in possession is not an validated object instance associated with a particular unique serialized symbology authenticated as a captured symbology.

The term "counterfeit object instance" refers to an object that does not match expected characteristics represented by object information corresponding to a particular unique serialized symbology.

The term "validated object instance" refers to an object that matches characteristics represented by object information corresponding to a particular unique serialized symbology. A unique serialized symbology in some embodiments is generated based at least in part on object information that represents characteristics for a particular object with which that unique serialized symbology is to be associated.

The term "aggregated data" refers to tallied, added, or otherwise combined data generated based at least in part on a plurality of separate portions of trust network data.

The term "trusted symbology user device" refers to at least one computer embodied in hardware, software, firmware, and/or a combination thereof, and usable by a trusted user account authenticated via a serialization processing portal as associated with at least one unique serialized symbology, and that is configured for retrieving data analytics, aggregated data, and/or other information regarding processed scans associated with such at least one unique serialized symbology.

The term "additional information request" refers to electronically managed data renderable to an end user device that prompts an end user of the end user device for particular data value(s) associated with an object in possession by the end user and/or scan of a captured symbology by the end user via the end user device associated with an object in possession by the end user.

The term "camera application" refers to a software application executed on an end user device that enables capturing of image data via a camera of the end user device, that is created and/or controlled by a different entity than an entity that created and/or controls a serialization processing portal, and that is configured to provide functionality for detecting and/or decoding one or more type(s) of machine-readable symbology. A camera application includes a camera software application installed to a user computing device by default as part of a particular operating system installed on the user computing device, such as Apple's camera application installed with iOS, Android's camera application installed with the Android operating system, and Microsoft's camera application installed with Windows operating system.

The term "user-facing application" with respect to a serialization processing portal refers to a custom-coded software application executed on an end user device that is created and/or controlled by the same entity that created and/or controls the serialization processing portal, and that enables generation of a scan of a captured symbology for validation via the serialization processing portal.

Systems and Apparatuses of the Disclosure

FIG. 1 illustrates a block diagram of a system that may be specially configured within which embodiments of the present disclosure may operate. Specifically, FIG. 1 illustrates an example system 100. The example system 100 includes a trust network system 102 in communication with an end user device 104 and optionally a trusted symbology user device 106. The trust network system 102 includes a serialization trust network processing service 102A and optionally a serialization generation service 102B. In some embodiments, the system 100 may not include the serialization generation service 102B and/or the trusted symbology user device 106, for example in a circumstance where the system 100 facilitates validation of captured symbologies and/or object(s) associated therewith but not generation of unique serialized symbologies.

The trust network system 102 includes one or more computer(s) embodied in hardware, software, firmware, or any combination thereof. In some embodiments, the trust network system 102 includes one or more application server(s), database server(s), enterprise computing terminal(s), and/or the like, that are configured to perform the functionality described herein. Additionally or alternatively, in some embodiments, the trust network system 102 includes one or more virtual computer(s) embodied in a software environment on particular hardware. In some embodiments, some or all of the trust network system 102 is within the same physically defined space, such as a data warehouse, a company headquarters, and/or the like. Additionally or alternatively, in some embodiments, the trust network system 102 includes one or more cloud computer(s) located remotely from one another that communicate in conjunction with one another to provide the described functionality. In some embodiments, the trust network system 102 includes a plurality of sub-services that each provide a portion of the functionality performed by the trust network system 102. In some such embodiments, the plurality of sub-services are each embodied by different hardware, software, firmware, and/or a combination thereof. Alternatively or additionally, in some embodiments, one or more of the sub-services share particular hardware, software, firmware, and/or a combination thereof. For example, in some embodiments, the serialization trust network processing service 102A and the serialization generation server 102B embody specially-configured software applications executed on shared hardware.

In some embodiments, the trust network system 102 supports serialization as a service. In some such embodiments, the trust network system 102 may embody a backend system located remotely from one or more end user devices utilized to access the backend system via a portal (e.g., a web portal). In this regard, the trust network system 102 may be remotely accessed to perform any or all of the functionality described herein as a service to the corresponding user device. For example, in some embodiments, the trust network system 102 is accessed to provide access to functionality for unique serialized symbology generation, unique serialized symbology validation, data storage associated with attempted scans corresponding to a unique serialized symbology, and/or data accessing and/or sharing associated with at least a unique serialized symbology. It will be appreciated that a serialization as a service system need not be operated on hardware controlled by any of the end users accessing such a service, but in some embodiments may be controlled by one or more of such end users.

In some embodiments, the trust network system 102 supports functionality associated with maintaining object information associated with validated object instances and/or unique serialized symbologies associated therewith, and perform validation of an indicated scan. The scan may be a representation of captured symbology, such as any machine-readable symbology believed or asserted to be a unique serialized symbology associated with a particular object in possession, to determine object information usable to validate authenticity of the particular object. Additionally or alternatively, in some embodiments the validation determines validation information indicating at least whether the scan was successfully validated as representing a unique serialized symbology. Additionally or alternatively still, in some embodiments, the trust network system 102 supports functionality associated with generation of unique serialized symbologies corresponding to particular objects, and storage of data associated with the generated unique serialized symbologies for use in subsequent validation.

The serialization generation service 102B includes one or more computer(s) embodied in hardware, software, firmware, or any combination thereof. In some embodiments, the serialization generation service 102B includes one or more application server(s), database server(s), enterprise computing terminal(s), and/or the like, that are configured to perform the functionality described herein. Additionally or alternatively, in some embodiments, the serialization generation service 102B includes one or more virtual computer(s) embodied in a software environment on particular hardware. In some embodiments, some or all of the trust serialization generation service 102B is within the same physically defined space, such as a data warehouse, a company headquarters, and/or the like. Additionally or alternatively, in some embodiments, the serialization generation service 102B includes one or more cloud computer(s) located remotely from one another that communicate in conjunction with one another to provide the described functionality.

In some embodiments, the serialization generation service 102B supports functionality associated with generating unique serialized symbologies associated with particular objects. In some embodiments, for example, the serialization generation service 102B supports receiving input of object information corresponding to a particular object for which a unique serialized symbology is to be generated. Additionally or alternatively in some embodiments, the serialization generation service 102B supports receiving input of a security level associated with the unique serialized symbology to be generated. Additionally or alternatively still, in some embodiments, the serialization generation service 102B supports generation of a particular specially configured machine-readable symbology, and/or supporting visual elements associated with a background to the machine-readable symbology, other supporting objects corresponding to the particular object (e.g., packaging), and/or the like, that embody the unique serialized symbology. Additionally or alternatively, in some embodiments, the serialization generation service 102B supports causing storing of data, for example the unique serialized symbology, object information associated therewith, identifiers associated therewith, and/or the like, to one or more database(s) utilized for subsequent validation(s), for example a trust database.

The serialization trust network processing service 102A includes one or more computer(s) embodied in hardware, software, firmware, or any combination thereof. In some embodiments, the serialization trust network processing service 102A includes one or more application server(s), database server(s), enterprise computing terminal(s), and/or the like, that are configured to perform the functionality described herein. Additionally or alternatively, in some embodiments, the serialization trust network processing service 102A includes one or more virtual computer(s) embodied in a software environment on particular hardware. In some embodiments, some or all of the serialization trust network processing service 102A is within the same physically defined space, such as a data warehouse, a company headquarters, and/or the like. Additionally or alternatively, in some embodiments, the serialization trust network processing service 102A includes one or more cloud computer(s) located remotely from one another that communicate in conjunction with one another to provide the described functionality.

In some embodiments, the serialization trust network processing service 102A supports functionality associated with performing validation of a scan. In some such embodiments, the serialization trust network processing service 102A supports maintaining a trust database associated with unique serialized symbologies and/or object information associated therewith. In some embodiments, for example, the serialization trust network processing service 102A supports receiving of a scan including captured data, such as a captured symbology, for processing. Additionally or alternatively, in some embodiments, the serialization trust network processing service 102A processes received data of a scan to determine authenticity of a captured symbology represented therein as a unique serialized symbology associated with a particular object utilizing a trust database, and/or transmission of validation information indicating the results of such a validation. Additionally or alternatively still, in some embodiments, the serialization trust network processing service 102A supports processing of a captured symbology representing a unique serialized symbology to determine object information associated therewith, such as by detecting and/or decoding a particular unique object-linked identifier represented in the captured symbology and querying a corresponding trust database, and providing validation information including the object information to an end user device for use in validating a particular object instance. Additionally or alternatively, in some embodiments the serialization trust network processing service 102A supports providing additional information request(s) and/or storing response data associated with such additional information request(s) corresponding to a particular scan and/or validation. Additionally or alternatively still, in some embodiments the serialization trust network processing service 102A receives, identifies, generates, and/or stores aggregated data associated with validation attempts associated with particular unique object-linked identifier(s) and/or unique serialized symbologies, for example indicating a number of attempts to validate a captured symbology representing a particular unique object-linked identifier as a corresponding unique serialized symbology, a number of times such validations were successful or not successful, location data associated with successful and/or unsuccessful validations, time data associated with successful and/or unsuccessful validations, and/or the like.

The end user device 104 includes one or more computer(s) embodied in hardware, software, firmware, and/or any combination thereof. In some embodiments, the end user device 104 embodies a single consumer computer accessed by, possessed by, and/or otherwise owned by an end user. For example, in some embodiments, the end user device 104 includes a smartphone, a tablet, a personal computer, a laptop, a desktop, a smart watch, a smart home device, an Internet-of-Things enabled device, and/or the like. The end user device 104 in some embodiments is configured via hardware, software, firmware, and/or a combination thereof for performing scanning of a machine-readable symbology for validation of the machine-readable symbology as a unique serialized symbology and/or for obtaining object information usable to validate a corresponding object in possession as an validated object instance or a counterfeit object instance. For example, in some embodiments, the end user device 104 is configured to enable capturing of image data representing a scan (e.g., via a camera build into or communicatively coupled as a peripheral of the end user device 104), processing of captured image data for detecting and/or decoding one or more type(s) of a machine-readable symbology therein, accessing the trust network system 102 via a serialization processing portal utilizing a browser application, and/or communication with the trust network system 102 and/or other external device(s) via at least one communications network. In some embodiments, some or all of such functionality is provided out-of-the-box by the end user device 104, for example as part of functionality provided by an operating system of the end user device 104 and/or pre-installed application(s) associated therewith, such as a camera application and/or browser application installed with a particular operating system of the end user device 104. In some embodiments, the end user device 104 communicates with the trust network system 102 without requiring the end user to authenticate their identity and/or without requiring association with any registered user account.

The trusted symbology user device 106 includes one or more computer(s) embodied in hardware, software, firmware, and/or any combination thereof. In some embodiments, the trusted symbology user device 106 embodies a single consumer computer, accessed by, possessed by, and/or otherwise owned by a trusted symbology user. For example, in some embodiments, the trusted symbology user device 106 includes a smartphone, a tablet, a personal computer, a laptop, a desktop, a smart watch, a smart home device, an Internet-of-Things enabled device, and/or the like. The trusted symbology user device 106 in some embodiments is configured via hardware, software, firmware, and/or a combination thereof for communicating with the trust network system 102 for generating at least one unique serialized symbology and/or accessing information associated with at least one generated unique serialized symbology. For example, in some embodiments, the trusted symbology user device 106 is configured to enable inputting of object information to be linked to an associated unique serialized symbology, where the object information is usable to validate authenticity of a corresponding object in possession. Additionally or alternatively, in some embodiments, the trusted user device 106 is configured to enable printing of a unique serialized symbology, for example onto an object corresponding to the unique serialized symbology, a tag associated with the object, packaging associated with the object, and/or the like. Additionally or alternatively still, in some embodiments, the trusted symbology user device 106 is configured to enable viewing of and/or transmission of a query for aggregated data associated with a particular unique object-linked identifier corresponding to a particular unique serialized symbology generated for a particular object. In some embodiments, a trusted symbology user device 106 communicates with the trust network system 102 to authenticate a particular trusted symbology user account, and can subsequently generate unique serialized symbologies associated with that account and/or access aggregated data corresponding to previously generated unique serialized symbologies associated with that account.

In some embodiments, the various devices of the system 100 over a communications network 108. For example, in some embodiments, the trust network system 102 is communicable with the end user device 104 and/or trusted symbology user device 106 via Wi-Fi, the Internet, or another public or private communications network that may span a large area. In some such embodiments, the devices communicate via a shorter-range communications network, for example Bluetooth low energy or the like. Alternatively or additionally, in some embodiments devices communicate over any wired, wireless, long-range, and/or short-range wireless communications network(s).

The communications network 108 as described in some embodiments is embodied in any of a myriad of network configurations. In some embodiments, the communications network 108 embody a public network (e.g., the Internet). In some embodiments, the communications network 108 embodies a private network (e.g., an internal, localized, or closed-off network between particular devices). In some other embodiments, the communications network 108 embody a hybrid network (e.g., a network enabling internal communications between particular connected devices and external communications with other devices). The communications network 108 in some embodiments includes one or more base station(s), relay(s), router(s), switch(es), cell tower(s), communications cable(s) and/or associated routing station(s), and/or the like. In some embodiments, the communications network 108 includes one or more user controlled computing device(s) (e.g., a user owner router and/or modem) and/or one or more external utility devices (e.g., Internet service provider communication tower(s) and/or other device(s)).

The computing device(s) each may communicate over a whole or a portion of one or more communications network(s), such as the communication network 108. For example, each of the components of the system communicatively coupled to transmit data to and/or receive data from, for example, one another over the same or different wireless or wired networks embodying the communications network(s). Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network(s), the various embodiments are not limited to this particular architecture. In other embodiments, one or more computing entities share one or more components, hardware, and/or the like, or otherwise are embodied by a single computing device such that connection(s) between the computing entities are over the communications network(s) are altered and/or rendered unnecessary. Alternatively or additionally still, in some embodiments the communications network 108 enable communication to one or more other computing device(s) not depicted, for example client device(s) for accessing functionality of any of the subsystems therein via native and/or web-based application(s), and/or the like.

FIG. 2 illustrates a block diagram of an example apparatus that may be specially configured in accordance with an example embodiment of the present disclosure. Specifically, FIG. 2 illustrates an example serialization processing apparatus 200 ("apparatus 200") specially configured in accordance with at least one example embodiment of the present disclosure. In some embodiments, the trust network system 102, and/or a portion thereof, is embodied by one or more system(s), device(s), and/or the like, such as the apparatus 200 as depicted and described in FIG. 2. The apparatus 200 includes processor 202, memory 204, input/output circuitry 206, communications circuitry 208, trust network validation circuitry 210, optional data maintenance circuitry 212, and/or optional symbology generation circuitry 214. In some embodiments, the apparatus 200 is configured, using one or more of the sets of circuitry 202, 204, 206, 208, 210, 212, and/or 214, to execute and perform one or more of the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with unique serialized symbology generation and/or trusted validation. In some embodiments, the processor 202 includes hardware, software, firmware, and/or a combination thereof, that stores data associated with one or more unique serialized symbologies, such as object information associated with each particular unique serialized symbology. Additionally or alternatively, in some embodiments, the processor 202 includes hardware, software, firmware, and/or a combination thereof, that receives an indication of a scan from an end user device, the indication of the scan associated with a captured symbology. Additionally or alternatively, in some embodiments, the processor 202 includes hardware, software, firmware, and/or a combination thereof, that processes a scan, for example to detect and/or decode the captured symbology. Additionally or alternatively, in some embodiments, the processor 202 includes hardware, software, firmware, and/or a combination thereof, that performs one or more validation(s) of the scan of the captured symbology and/or user-provided data associated with a scan. Additionally or alternatively, in some embodiments, the processor 202 includes hardware, software, firmware, and/or a combination thereof, that outputs validation information associated with a scan. Additionally or alternatively, in some embodiments, the processor 202 includes hardware, software, firmware, and/or a combination thereof, that generates a unique serialized symbology associated with an object, for example based at least in part on a unique object-linked identifier inputted via a user and/or generated by the apparatus 200. Additionally or alternatively, in some embodiments, the processor 202 includes hardware, software, firmware, and/or a combination thereof, that pushes data associated with the unique serialized symbology to a trusted database. Additionally or alternatively, in some embodiments, the processor 202 includes hardware, software, firmware, and/or a combination thereof, that initiates access for a particular user to a serialization trust processing service.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user. In some embodiments, the input/output circuitry 206 includes hardware, software, firmware, and/or a combination thereof, that facilitates simultaneously display of particular data via a plurality of different devices.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device, capture device, and/or other external computing device in communication with the apparatus 200.

In some embodiments, the apparatus 200 includes trust network validation circuitry 210. The trust network validation circuitry 210 includes hardware, software, firmware, and/or a combination thereof, that supports various functionality associated with performing validation(s) of indicated scan(s). For example, in some embodiments the trust network validation circuitry 210 includes hardware, software, firmware, and/or a combination thereof, that maintains a trusted database associated with one or more unique serialized symbologies, unique object-linked identifiers associated therewith, trust network data, and/or aggregated data, or any combination thereof. Additionally or alternatively, in some embodiments the trust network validation circuitry 210 includes hardware, software, firmware, and/or a combination thereof, that receives a scan of a captured symbology, for example from an end user device. Additionally or alternatively, in some embodiments the trust network validation circuitry 210 includes hardware, software, firmware, and/or a combination thereof, that retrieves object information associated with a captured symbology and/or transmits the object information to an end user device, for example based at least in part on a data identifier decoded from a captured symbology. Additionally or alternatively, in some embodiments the trust network validation circuitry 210 includes hardware, software, firmware, and/or a combination thereof, that performs one or more validation of a scan of a captured symbology. Additionally or alternatively, in some embodiments the trust network validation circuitry 210 includes hardware, software, firmware, and/or a combination thereof, that provides validation information to an end user device. In some embodiments, the trust network validation circuitry 210 includes a separate processor, specially configured field programmable gate array (FPGA), or a specially programmed application specific integrated circuit (ASIC).

In some embodiments, the apparatus 200 optionally includes data maintenance circuitry 212. The data maintenance circuitry 212 includes hardware, software, firmware, and/or a combination thereof, that supports various functionality associated with maintaining data in a trust database. For example, in some embodiments, the data maintenance circuitry 212 includes hardware, software, firmware, and/or a combination thereof, that receives object information corresponding to a unique serialized symbology, and/or stores the object information to a trust database. Additionally or alternatively, in some embodiments, the data maintenance circuitry 212 includes hardware, software, firmware, and/or a combination thereof, that generates aggregated data associated with a particular unique serialized symbology, and/or stores the aggregated data to a trust database. Additionally or alternatively, in some embodiments, the data maintenance circuitry 212 includes hardware, software, firmware, and/or a combination thereof, that links data with a particular data identifier, for example a unique object-linked identifier corresponding to a particular unique serialized symbology. Additionally or alternatively, in some embodiments, the data maintenance circuitry 212 includes hardware, software, firmware, and/or a combination thereof, that retrieves data from a trust database. Additionally or alternatively, in some embodiments, the data maintenance circuitry 212 includes hardware, software, firmware, and/or a combination thereof, that causes rendering of data retrieved from a trust database. In some embodiments, the data maintenance circuitry 212 includes a separate processor, specially configured field programmable gate array (FPGA), or a specially programmed application specific integrated circuit (ASIC).

In some embodiments, the apparatus 200 optionally includes symbology generation circuitry 214. The symbology generation circuitry 214 includes hardware, software, firmware, and/or a combination thereof, that supports various functionality associated with generating a unique serialized symbology. For example, in some embodiments, the symbology generation circuitry 214 includes hardware, software, firmware, and/or a combination thereof, that receives a request to generate a unique serialized symbology, for example corresponding to a user identifier for an authenticated account associated with a trusted symbology user device. Additionally or alternatively, in some embodiments, the symbology generation circuitry 214 includes hardware, software, firmware, and/or a combination thereof, that identifies a particular security level, for example in response to user selection from a plurality of candidate security levels. Additionally or alternatively, in some embodiments, the symbology generation circuitry 214 includes hardware, software, firmware, and/or a combination thereof, that generates a unique serialized summary, for example based at least in part on a unique object-linked identifier, a selected security level, a user identifier, and/or the like. Additionally or alternatively, in some embodiments, the symbology generation circuitry 214 includes hardware, software, firmware, and/or a combination thereof, that causes printing of a generated unique serialized symbology. Additionally or alternatively, in some embodiments, the symbology generation circuitry 214 includes hardware, software, firmware, and/or a combination thereof, that pushes object information to a trusted database, for example for storing associated with a unique serialized symbology. Additionally or alternatively, in some embodiments, the symbology generation circuitry 214 includes hardware, software, firmware, and/or a combination thereof, that initiates access to a trust network processing service maintaining the trust database. In some embodiments, the symbology generation circuitry 214 includes a separate processor, specially configured field programmable gate array (FPGA), or a specially programmed application specific integrated circuit (ASIC).

Additionally or alternatively, in some embodiments, two or more of the sets of circuitries 202-214 are combinable. Alternatively or additionally, in some embodiments, one or more of the sets of circuitry perform some or all of the functionality described associated with another component. For example, in some embodiments, two or more of the sets of circuitry 202-214 are combined into a single module embodied in hardware, software, firmware, and/or a combination thereof. Similarly, in some embodiments, one or more of the sets of circuitry, for example the trust network validation circuitry 210, the data maintenance circuitry 212, the symbology generation circuitry 214, is/are combined with the processor 202, such that the processor 202 performs one or more of the operations described above with respect to each of these sets of circuitry 210-214.

Example Data Environments of the Disclosure

Having described example systems and apparatuses in accordance with the disclosure, example data environments and data flows of the disclosure will now be discussed. In some embodiments, each example data environment is maintained by one or more of the example systems and apparatuses as described herein. Additionally or alternatively, in some embodiments, the example systems and apparatuses described herein may communicate with one another in accordance with the data flow(s) as depicted and described. In some embodiments, the apparatus 200 maintains the data environments and/or performs the described data flows.

FIG. 3 illustrates an example visualization of association between a unique serialized symbology and related authentication elements with a particular object for validation in accordance with at least an example embodiment of the present disclosure. Specifically, FIG. 3 illustrates an example object 300. The example object 300 includes a machine-readable symbology 302. In some embodiments, the machine-readable symbology 302 embodies a unique serialized symbology associated with the object 300. In some embodiments, the machine-readable symbology 302 is printed onto the object 300 and/or packaging associated therewith, for example onto an exterior box of the object 300. In some embodiments, the machine-readable symbology 302 includes one or more additional authentication element(s) that increase the difficulty in reproducing the machine-readable symbology 302 in an unauthorized instance.

The object 300 includes one or more additional authentication element(s). For example, in some embodiments, the object 300 includes one or more additional authentication element(s) printed to the packing of the object 300, for example the additional element(s) 304. In some embodiments, the additional element(s) 304 are printed on packaging associated with the object 300 including one or more visual element(s) perceptible to a computer even if not detectable by a human operator.

In some embodiments, the machine-readable symbology 302 is generated by the apparatus 200. For example, in some embodiments, the apparatus 200 causes printing of a unique serialized symbology embodying the machine-readable symbology 302. Additionally or alternatively, in some embodiments, the apparatus 200 enables validation of a scan associated with the object and/or machine-readable symbology 302. For example, in some embodiments, the end user device 306 communicates with the apparatus 200 to perform the validation(s) of the machine-readable symbology 302 as a captured symbology, as depicted and described herein.

In one example context, the machine-readable symbology 302 is scanned in a circumstance where an end user desires to validate the object 300 as a validated object instance. In some embodiments, the end user device 306 is utilized to capture an image representation of the object 300. The image representation may include a representation of the machine-readable symbology 302 as a captured symbology. In some embodiments, the end user utilizes integrated hardware and/or peripherals of the end user device 306 to capture the image embodying a scan, and/or default application(s) on the end user device 302 to access a particular serialization processing portal. For example, in some embodiments, the end user device 306 is utilized to decode the machine-readable symbology 302 representing a URL endpoint, where the URL endpoint is utilized to initiate a browser application to a serialization processing portal associated with a particular identifier representing a unique object-linked identifier. In some such embodiments, the user device 306 receives object information via the serialization processing portal, for example to enable an end user of the end user device 306 to utilize such object information to validate visual characteristics of the object 300 and/or packaging thereof.

FIG. 4 illustrates an example data flow for performing serialization validation of a scanned code in a trust network in accordance with at least an example embodiment of the present disclosure. Specifically, FIG. 4 illustrates a data flow between a serialization trust network processing service 452 and an end user device 454. In some embodiments, the serialization trust network processing service 452 is embodied by the apparatus 200 as depicted and described herein.

At step 402 the serialization trust network processing service 452 stores a unique serialized symbology, and/or data associated with a unique serialized symbology, to a trusted database. For example, in some embodiments, the serialization trust network processing service 452 stores the unique serialized symbology and/or data associated therewith to a trusted database 456. In some embodiments the trusted database 456 is embodied by and/or maintained by the serialization trust network processing service 452.

At step 404, for example at any time subsequent to the storing at step 402, the end user device 454 scans a particular machine-readable symbology, for example the machine-readable symbology 458. In some embodiments, the end user device 454 scans the machine-readable symbology 458 by utilizing a camera to capture an image representation of the machine-readable symbology 458, the captured image representation embodying a captured symbology. In some embodiments, an end user of the end user device 454 utilizes default and/or preinstalled application(s) provided with the end user device 454, for example installed together with an operating system of the end user device 454, to capture an image representation embodying a scan of the machine-readable symbology 458.

At step 406, the end user device 454 accesses a serialization processing portal based at least in part on the scanning of the machine-readable symbology 458. For example, in some embodiments, the serialization processing portal is embodied as a web application maintained at a particular web endpoint by the serialization trust network processing service 452. In some embodiments, the end user device 454 is capable of accessing the serialization processing portal via the Internet, for example utilizing a browser application accessible via the user device 454. In some embodiments, the machine-readable symbology 458 encodes the particular endpoint corresponding to the serialization processing portal, such that scanning of the machine-readable symbology 458 causes initiation of accessing the serialization processing portal by launching the browser application to the particular endpoint represented thereby. Alternatively or additionally, in some embodiments, the serialization processing portal is accessed via a user-facing application associated with the serialization trust network processing service 452 executing on the end user device 454. In some embodiments, the machine-readable symbology 458 additionally or alternatively, in some embodiments, transmits particular data for processing via the serialization processing system. For example, in some embodiments, the end user device 456 decodes particular data for transmission to the serialization trust network processing service 452 via the serialization processing portal. In some such embodiments, the machine-readable symbology 458 embodies or includes a unique object-linked identifier that corresponds to a particular unique serialized symbology and/or object information maintained via the serialization trust network processing service 452. Additionally or alternatively, in some embodiments, the end user device 456 transmits trust network data associated with the scan of the machine-readable symbology 458.

In some embodiments, the machine-readable symbology 458 embodies a nested symbology utilized for accessing a serialization processing portal with particular data. For example, in some embodiments, the nested symbology includes a first symbology that represents an endpoint or other data utilized to facilitate access to the serialization processing portal. Additionally, in some embodiments the nested symbology includes a second symbology that represents data to be submitted via the serialization processing portal for processing. For example, in some embodiments, the second symbology of the nested symbology encodes a unique object-linked identifier for processing via the serialization trust network processing service 452. In some embodiments, the first symbology is decodable by any standard methodology for detecting and/or decoding machine-readable symbologies of a certain type, and the second symbology is decodable utilizing a customized detection and/or decoding algorithm accessible only via the serialization trust network processing service 452 utilizing the serialization processing portal, for example. In this regard, the detecting and/or decoding algorithm(s) may be based at least in part on authentication elements utilized to generate the corresponding unique serialized symbology.

At step 408, the serialization trust network processing service 452 optionally performs at least one validation of an indication of the scan received at the serialization trust network processing service 452. In some embodiments, the serialization trust network processing service 452 performs one or more validations that determines whether visual elements present in the captured symbology match expected authentication elements associated with a unique serialized symbology represented by a data identifier represented in the machine-readable symbology 458. For example, in some embodiments, the serialization trust network processing service 452 identifies the authentication elements from a trust database, such as the trust database 456, based at least in part on a unique object-linked identifier represented in the machine-readable symbology 458.

At step 410, the serialization trust network processing service 452 retrieves validation information based at least in part on the scan of the machine-readable symbology 458. In some embodiments, the serialization trust network processing service 452 identifies and/or generates validation information embodying at least one data value indicating whether validation of the captured symbology represented in the scan was successful. Additionally or alternatively, in some embodiments, the serialization trust network processing service 452 retrieves object information associated with the machine-readable symbology 458 for including in the validation information. For example, in some embodiments, the serialization trust network processing service 452 retrieves such object information from a trust database 456 based at least in part on a data identifier, such as a unique object-linked identifier, identified via the trust database 456. In some embodiments, the serialization trust network processing service 452 generates validation information including the retrieved object information. In some embodiments, the object information includes an image of an object associated with the unique object-linked identifier, for example where the object depicted is a validated object instance. Additionally or alternatively, in some embodiments, the object information includes manufacturing information associated with production of a particular object. In some embodiments, a scan is indicated as successful so long as any machine-readable symbology was successful detected and decoding corresponding to a particular stored unique object-linked identifier.

At step 412, the serialization trust network processing service 452 provides at least the validation information to the end user device 454. In some embodiments, the serialization trust network processing service 452 transmits the validation information in one or more response transmission(s) to the end user device 454. In some embodiments, the serialization trust network processing service 452 transmits the validation information via the serialization processing portal maintained by the serialization trust network processing service 452.

At optional step 414, the end user device 454 transmits user-provided information to the serialization trust network processing service 452. In some embodiments, the end user device 454 transmits user-provided information indicating whether an object in possession of a user of the end user matches object information received from the serialization trust network processing service 452. Additionally or alternatively, in some embodiments, the user-provided information indicates a context of the scan of the machine-readable symbology 458. For example, in some embodiments, the user-provided information embodies whether visual characteristics of the object in possession of an end user matches visual characteristics represented in object information retrieved associated with the machine-readable symbology 458.

At optional step 416, the serialization trust network processing service 452 stores at least one data indication based at least in part on the user-provided information. In some embodiments, the serialization trust network processing service 452 stores a counterfeit indication in a circumstance where the user-provided information indicates that the object in possession of the end user did not match visual characteristics represented by the retrieved object information. In this regard, the counterfeit indication in some embodiments indicates that the object embodies a counterfeit object instance. Additionally or alternatively, in some embodiments, the serialization trust network processing service 452 stores a validation indication in a circumstance where the user-provided information indicates that the object in possession of the end user matched visual characteristics represented by the retrieved object information. In this regard, the validated indication in some embodiments indicates that the object embodies a validated object instance.

At optional step 418 generates aggregated data based at least in part on the received user-provided information. For example, in some embodiments, the serialization trust network processing service 452 aggregates trust network data associated with the scan of the machine-readable symbology 458. In some embodiments, the data is aggregated associated with a particular data identifier. For example, the data identifier may represent whether the validation of the object was successful (e.g., indicating that the object is a validated object instance) or unsuccessful (e.g., indicating that the object is a counterfeit object instance). In some embodiments, the aggregated data is stored associated with each individual unique serialized symbology and/or unique object-linked identifier associated therewith.

FIG. 5 illustrates an example data flow for performing unique serialized symbology generation for use in a trust network in accordance with at least an example embodiment of the present disclosure. Specifically, FIG. 5 illustrates a data flow between a serialization trust network processing service 452, a serialization generation service 552, and a trusted symbology user device 554. In some embodiments, the serialization trust network processing service 452 and/or the serialization generation service 552 is/are embodied by the apparatus 200 as depicted and described herein.

At optional step 502, the trusted symbology user device 554 initiates an authenticated session. In some embodiments, the trusted symbology user device 554 initiates an authenticated session associated with a particular trusted symbology user account registered with the serialization generation service 552. In some embodiments, the trusted symbology user device 554 accesses a particular portal associated with the serialization generation service 552, for example a serialization processing portal, via a browser application and/or a user-facing application to initiate access of the serialization generation service 552 via the serialization processing portal. In some embodiments, a trusted symbology end user of the trusted symbology user device 554 transmits user authentication credentials that are validated by the serialization generation service 552 as associated with a particular registered trusted symbology user account to initiate an authenticated session associated with said user account. In some embodiments, each subsequently transmitted portion of data and/or request is associated with the authenticated trusted symbology user account.

At optional step 504 that transmits a request to generate a unique serialized symbology. In some embodiments, the unique serialized embodiment includes or otherwise indicates a particular object with which the unique serialized symbology is to be generated. Additionally or alternatively, in some embodiments, the trusted symbology end user of the trusted symbology user device 554 generates a request including at least a selection or other user input of an object identifier, unique object-linked identifier, and/or the like utilized to generate the unique serialized symbology. Alternatively or additionally, in some embodiments, the request includes at least object information associated with the object corresponding to the unique serialized symbology to be generated. In some embodiments, the request is transmitted to the serialization generation service 552 from the trusted symbology user device 554 in one or more data transmissions, for example transmitted over one or more communications network(s).

At optional step 506, the serialization generation service 552 identifies object information, where the object information is linked to the unique object-linked identifier. In some embodiments, the object information is identified from one or more transmission(s) received from the trusted symbology user device 554, for example at step 504. Alternatively or additionally, in some embodiments the serialization generation service 552 retrieves stored object information for use. For example, in some embodiments the trusted symbology user device 554 is utilized to provide such object information to the serialization generation service 552 for storage, such that the stored object information can be retrieved and subsequently utilized in generating a unique serialized symbology. In some embodiments, the trusted symbology end user of the trusted symbology user device 554 selects previously-stored object information from the serialization generation service 552 to identify such object information for use.

At step 508, the serialization generation service 552 generates a unique object-linked identifier. In some embodiments, the serialization generation service 552 receives the unique object-linked identifier in a previous transmission from the trusted symbology user device 554, and identifies the unique object-linked identifier from the transmission. Additionally or alternatively, in some embodiments, the serialization generation service 552 generates the unique object-linked identifier. In some such embodiments, the serialization generation service 552 may utilize a randomization algorithm to assign a random or pseudorandom data value as the unique object-linked identifier. In some such embodiments, the unique object-linked identifier may embody a universal unique identifier across all objects. In some embodiments, the unique object-linked identifier embodies a SKU associated with a particular object, for example corresponding to particular object visual characteristics, type, and/or the like.

At step 510, the serialization generation service 552 generates a unique serialized symbology. In some embodiments, the unique serialized symbology is generated based at least in part on the unique object-linked identifier. For example, in some embodiments, the serialization generation service 552 utilizes an encoding algorithm to encode at least the unique object-linked identifier into a visually-represented machine-readable symbology. Additionally or alternatively, in some embodiments, the unique serialized symbology encodes at least an endpoint (e.g., a web URL) for accessing a serialization processing portal associated with accessing information associated with the unique serialized symbology. Additionally or alternatively still, in some embodiments, the serialization generation service 552 generates the unique-serialized code including one or more customized visual element(s), for example additional authentication element(s). In some embodiments, the serialization generation service 552 generates the unique serialized symbology based at least in part on a selected security level, for example previously stored associated with the trusted symbology user device 554, previously-stored associated with a particular user account authenticated associated with the trusted symbology user device 554, selected via the trusted symbology user device 554, and/or the like.

At step 512, the serialization generation service 552 pushes data to a trust database. In some embodiments, the trust database is maintained by the serialization trust network processing service 452. In some such embodiments, the data pushed to the trust database may be subsequently retrieved and utilized in one or more validation(s), for example as depicted and described with respect to FIG. 4 and/or further herein.

In some embodiments, the serialization generation service 552 pushes particular data associated with a unique serialized symbology to the trust database for subsequent use. For example, in some embodiments, the serialization generation service 552 pushes at least the unique object-linked identifier and object information associated with the unique object-linked identifier to the trust database for storage. In some such embodiments, pushing the data to the trust database may cause storage of such data in the trust database. In some embodiments, the unique object-linked identifier embodies a key utilized to retrieve the object information, and/or other data, from the trust database via one or more query/queries, for example upon decoding the unique object-linked identifier from a machine-readable symbology embodying a unique serialized symbology.

At step 514, the serialization generation service 552 provides the unique serialized symbology to the trusted symbology user device 554. In some embodiments, the serialization generation service 552 provides the unique serialized symbology via one or more transmission(s) to the trusted symbology user device 554. In some embodiments, the serialization generation service 552 provides the unique serialized symbology via a serialization processing portal accessed by the trusted symbology user device 554. In some embodiments, provision of the unique serialized symbology causes the trusted symbology user device 554 to store the unique serialized symbology for subsequent use.

At step 516, the trusted symbology user device 554 initiates printing, attachment, or other application of the unique serialized symbology to at least one object. For example, in some embodiments, the trusted symbology user device 554 initiates printing of the unique serialized symbology onto an object having the visual characteristics represented by the object information corresponding to the particular unique serialized symbology. It will be appreciated that, in some embodiments, the trusted symbology user device 554 initiates printing of the unique serialized symbology 556 for use in branding or otherwise enabling identification of the object as an authentic object instance from a particular source (e.g., a particular manufacturer). In this regard, the resulting unique serialized symbology 556 may be visibly present on the object, tag, packaging, and/or other supporting object associated with the object for use by an end user as described herein for validation.

In some embodiments, at optional step 518 the trusted symbology user device 554 transmits one or more query/queries ("query(s)") for data analytics to the serialization trust network processing service 452. In some embodiments, for example, the query(s) include or otherwise identify a particular unique object-linked identifier for which data analytics should be retrieved. In some embodiments, the unique object-linked identifier is input by a trusted symbology end user via the trusted symbology user device 554. Additionally or alternatively, in some embodiments, the trusted symbology end user selects data analytics for a particular object, such that the unique object-linked identifier corresponding to that object is identified by the trusted symbology user device 554 and/or the serialization trust network processing service 452 for use in subsequent data analytics retrieval. In some embodiments, the trusted symbology user device 554 transmits a query for aggregated data associated with the unique object-linked identifier, for example based at least in part on data aggregated from various scans that yielded the unique object-linked identifier, and/or successful or unsuccessful validation attempts of such scans and/or objects associated with such scans as described further herein. It will be appreciated that such scans may occur at any time subsequent to generation of the unique serialized symbology (e.g., as authentic transactions associated with an authentic object instance having a printed unique serialized symbology occur and/or counterfeit transactions associated with a counterfeit object instance is/are performed), resulting in tracked data, aggregated data, and/or the like maintained via the serialization trust network processing service 452 as described herein. In some embodiments, each query is embodied by a request transmission communicated to the serialization trust network processing service 452 via one or more communications network(s) from the trusted symbology user device 554.

At optional step 520, the serialization trust network processing service 452 retrieves the queried data analytics. In some embodiments, for example, to retrieve the queried data analytics the serialization trust network processing service 452 queries a trusted database based at least in part on the unique object-linked identifier included in or otherwise identified corresponding to the query for such data analytics. In some embodiments, the serialization trust network processing service 452 retrieves aggregated data based at least in part on the query. Alternatively or additionally, in some embodiments, each data record stored via the trusted database associated with a particular scan attempt, for example, is stored and retrievable for providing in response to the query for data analytics.

At optional step 522, the serialization trust network processing service 452 provides the queried data analytics to the trusted symbology user device 554. In some embodiments, the serialization trust network processing service 452 transmits the data retrieved at step 520 to the trusted symbology user device 554 to provide such data. In some embodiments, the data is provided in response to the query(s) transmitted to the serialization trust network processing service 452 at step 518. In some embodiments, the serialization trust network processing service 452 provides the queried data analytics via a serialization processing portal accessed via the trusted symbology user device 554. In this regard, the provided data may cause the trusted symbology user device 554 to render a user interface (e.g., via the serialization processing portal) to a display for viewing by the user, for example.

In some embodiments, the trust network embodied by at least the serialization trust network processing service 452 and/or the trusted database 456 is accessed and trust network data is collected associated with each attempted scan. Such trust network data may include data automatically determined and/or received, and in some embodiments includes one or more portion(s) of user-provided information. Additionally or alternatively, in some embodiments, one or more entities may access at least a portion of the trust network data stored associated with a particular attempted scan, unique object-linked identifier, and/or the like, and/or aggregated data associated with the particular attempted scan, unique object-linked identifier, and/or the like. For example, in some embodiments, the trust network represents a centralized source of truth for upstream and/or downstream users associated with a particular object. In a circumstance where an object represents a construction of various components, for example, access to data stored via the trust network may be shared between each entity downstream and/or upstream such that users may validate information associated with the object and/or components, uses, and/or the like.

Similarly, in some embodiments, such data sharing may enable identification of a source of one or more problem(s) or other circumstances associated with a particular object. For example in instances where a component of a particular object is identified as broken, non-functional, and/or the like, such data sharing may enable different users to track and/or determine which source(s) of the component is introducing the problem. In some such contexts, an end user associated with the source similarly may utilize such data sharing to diagnose the problem.

In some embodiments, different trusted symbology end users have control over stored data linked to their respective identifier and/or account. For example, in some embodiments, a trusted symbology end user is linked to each unique serialized symbology that is created via that user. In response to attempted scans associated with such symbology, trust network data may be stored and accessible to the trusted symbology end user, as well as any other user(s) (e.g., based on user identifier(s) and/or account(s)) with which the trusted symbology end user has shared data access. Data access may be shared per an individual unique serialized symbology, across all symbologies associated with a particular trusted symbology end user, and/or any other derivable grouping delimitations.

It will be appreciated that an end user that performs an attempted scan in some embodiments represents a customer or other non-commercial entity associated with a custody chain. Additionally or alternatively, in some embodiments, an end user is another trusted symbology end user. For example, in some embodiments, a first trusted symbology end user that generates the unique serialized symbology embodies a manufacturer of a particular object, and a second trusted symbology end user may scan the unique serialized symbology as a retailer of that object, a downstream and/or upstream source or destination commercial entity associated with creation and/or distribution of the object, and/or the like. In this regard, the data shared between users via the trust network may be based at least in part on a role of a particular entity associated with the object corresponding to the unique serialized symbology. For example, entities that form a custody chain or otherwise cooperate in manufacturing the object associated with the unique serialized symbology may be provided access to first data that is pertinent to sourcing, regulation, custody, and/or the like of components and the object itself, whereas an end user embodying a customer may have access to limited data as granted by one or more of such other entities as pertinent to the customer (e.g., custody chain information and validation information, in some examples).

In some embodiments trust network data is stored for each indication of a scan representing an attempted scan of a captured symbology as a unique serialized symbology. In some embodiments, stored and/or aggregated data (e.g., trust network data associated with an attempted scan) may be processed for any of a myriad of purposes. For example, in some embodiments, as trust network data is stored via the apparatus 200, some or all of such data may be processed to alter operation of a location at which the scan was initiated, initiate one or more chain of custody action(s), provide data indicating whether a validation was successful and/or object information associated with a scan for further validation to an end user, and/or the like.

FIG. 6 illustrates an example visualization of different elements of unique serialized symbologies associated with different security levels in accordance with at least an example embodiment of the present disclosure. Specifically, FIG. 6 illustrates an example of different security levels for use in generating a unique serialized symbology 602. In some embodiments, a unique serialized symbology may be generated associated with any selected security level of a plurality of candidate security levels. In this regard, each security level may be associated with a different difficulty to reproduce the unique serialized symbology without authorization. In this regard, higher-level security levels may be associated with additional authentication element(s) and/or different authentication element(s) that increases the difficulty in reproducing the machine-readable symbology embodying the unique serialized symbology 602. In this regard, in some embodiments, the same machine-readable symbology may be altered with one or more additional and/or alternative visual elements to increase and/or decrease the reproducibility of the machine-readable symbology embodying a unique serialized symbology, for example to reduce the ability of counterfeiters to readily match the authentic unique serialized symbology.

For example, in some embodiments, the apparatus 200 maintains a plurality of candidate security levels including at least a first security level 604A. In some embodiments, the first security level 604A embodies a unique serialized symbology including no additional authentication elements 606A. In this regard, the generated unique serialized symbology 602 generated using the first security level 604A may result in a machine-readable symbology having limited visual elements that prevent readily reproducing of the unique serialized symbology.

In some embodiments, the second security level 604B embodies a unique serialized symbology with at least one additional authentication element 606C. In this regard, the at least one additional authentication element may alter one or more visual elements of the machine-readable symbology that must be present to successfully validate the machine-readable symbology as a validated unique serialized symbology. In some embodiments, the at least one additional authentication element alters a color scheme of the machine-readable symbology, includes at least one design element integrated with or otherwise within the machine-readable symbology, and/or the like.

In some embodiments, the third security level 604C embodies a unique serialized symbology with at least one additional authentication element and packaging with at least one additional authentication element 606C. In this regard, in some embodiments the packaging includes a separate machine-readable symbology printed on said packaging. The machine-readable symbology printed on the packaging in some embodiments includes one or more additional authentication elements on the packaging that similarly increases the difficulty in reproducing the packaging and/or unique serialized symbology associated therewith. In this regard, the combination of the packaging additional authentication elements and the unique serialized symbology with additional authentication elements may be required to authenticate validity of a unique serialized symbology.

In some embodiments, the apparatus 200 maintains a plurality of candidate security levels for selection. In some such embodiments, the apparatus 200 may receive user input embodying a selection of a particular security level from the plurality of candidate security levels. Upon selection of a particular security level, in some embodiments the apparatus 200 generates a unique serialized symbology based at least in part on the selected security level. For example, in some embodiments, the apparatus 200 in some embodiments generates a unique serialized symbology having particular authentication elements generated based at least in part on the selected security level. In some such embodiments, a trusted symbology end user may be required to furnish higher payments to generate unique serialized symbologies of higher security level(s).

In some embodiments, a particular unique serialized symbology is associated with a plurality of authentication elements, and one or more of the authentication element(s) are authenticated only in circumstances where a trusted symbology end user initiates use of a higher security level. For example, in some embodiments, a unique serialized symbology includes a particular visual code embodied based at least in part on an applicable standard. The standard visual code may be decoded in all security levels. Additionally, the unique serialized symbology may include one or more embedded elements that are only authenticated in a circumstance where a trusted symbology user is associated with a higher security level. In this regard, some visual elements of the unique serialized symbology may only be authenticated in a circumstance where a corresponding trusted symbology end user accesses such higher security level(s).

Alternatively or additionally, in some embodiments, the apparatus 200 may perform one or more software-driven authentication(s) based on security level. For example, in some embodiments, the apparatus 200 performs authentication of GPS data received as trust network data associated with an attempted scan to validate whether the GPS data at the time of the scan falls within a valid geofenced area. Additionally or alternatively, in some embodiments, the apparatus 200 performs image processing to authenticate one or more other portion(s) of the scan not representing the captured symbology. For example, in some embodiments, the apparatus 200 performs object recognition to determine whether the object with which the captured symbology is printed on or otherwise associated matches an expected object. For example, in one example context where a unique serialized symbology is indicated as associated with a wine bottle, the apparatus 200 may perform image processing to confirm whether the captured symbology is printed on a wine bottle and not another object (e.g., a different type of bottle or entirely different object).

In some embodiments, different security levels are associated with the same type of additional authentication performed with different levels of fidelity. For example, in some embodiments, a GPS location determination-based authentication is performed at a first security level to confirm the device is within a 5 mile radius of an expected location. In a second, higher security level, the apparatus 200 may perform a GPS location determination-based authentication that confirms whether the end user device is within a 0.5 mile radius of the expected location. It will be appreciated that in other embodiments, an acceptable error threshold or confidence interval may be determined based on the security level associated with a particular trusted symbology end user and/or unique serialized symbology.

Example Processes of the Disclosure

Having described example systems and apparatuses, data environments, and related data flows in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 7 illustrates an example flowchart depicting example operations of a process for generating a unique serialized symbology for use in a trust network in accordance with at least an example embodiment of the present disclosure. Specifically, FIG. 7 illustrates an example computer-implemented process 700. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a separate end user device, trusted symbology user device, and/or the like. For purposes of simplifying the description, the process 700 is described as performed by and from the perspective of the apparatus 200.

The process 700 optionally begins at operation 702. At optional operation 702, the apparatus 200 includes trust network validation circuitry 210, data maintenance circuitry 212, symbology generation circuitry 214, communications circuitry 208, input/output circuitry 206, processor 202, and/or the like, or a combination thereof, that receives a request for accessing a serialization generation service via a serialization processing portal. In some embodiments, the apparatus 200 receives a request from a trusted symbology user device to enable access to functionality of the serialization generation service. In some embodiments, the apparatus 200 receives authentication credentials and initiates an authenticated session associated with a particular user account corresponding to the authentication credentials. For example, in some embodiments, the apparatus 200 authenticates a username and password associated with the user account. The authenticated user account may be linked to particular data maintained by or otherwise accessible to the apparatus 200, and/or such that data associated with subsequently-generated unique serialized symbologies may be stored associated with the authenticated user account.

At optional operation 704, the apparatus 200 includes trust network validation circuitry 210, data maintenance circuitry 212, symbology generation circuitry 214, communications circuitry 208, input/output circuitry 206, processor 202, and/or the like, or a combination thereof, that receives selection of a particular security level. In some embodiments, the apparatus 200 receives user input from a trusted symbology user device that indicates the particular selected security level. The particular security level in some embodiments defines particular authentication element(s) to be included in a generated unique serialized symbology. The authentication element(s) in some embodiments each define a visual property to configure of a machine-readable symbology and/or an additional visual element to include in or associated with a machine-readable symbology that increases the difficulty of copying the unique serialized symbology generated utilizing the machine-readable symbology. In some embodiments, the particular security level is selected from a plurality of candidate security levels. Each candidate security level may be associated with different authentication elements, such that the different security levels may be associated with different levels of difficulty to reproduce a corresponding unique serialized symbology generated utilizing the security level.

At optional operation 706, the apparatus 200 includes trust network validation circuitry 210, data maintenance circuitry 212, symbology generation circuitry 214, communications circuitry 208, input/output circuitry 206, processor 202, and/or the like, or a combination thereof, that automatically generates an unique serialized symbology. In some embodiments, the unique serialized symbology is generated based at least in part on the selection of the particular security level, for example at operation 704. In some embodiments, the unique serialized symbology includes at least a machine-readable symbology configured with particular visual element(s) and/or additional visual element(s) for increasing difficulty in reproducing the machine-readable symbology. The unique serialized symbology in some embodiments is generated by encoding a particular unique object-linked identifier. In some embodiments, the apparatus 200 generates the unique object-linked identifier, for example utilizing a randomization algorithm. In other embodiments, the apparatus 200 receives the unique object-linked identifier inputted via a trusted symbology user device. In some embodiments, the unique serialized symbology encodes or is otherwise associated with object information corresponding to a particular object with which the unique serialized symbology is linked, for example an object corresponding to the unique object-linked identifier encoded by the unique serialized symbology.

At operation 708, the apparatus 200 includes trust network validation circuitry 210, data maintenance circuitry 212, symbology generation circuitry 214, communications circuitry 208, input/output circuitry 206, processor 202, and/or the like, or a combination thereof, that receives a unique serialized symbology generated based at least in part on a particular security level. In some embodiments, the unique serialized symbology received is the unique serialized symbology generated at optional operation 706. In other embodiments, the unique serialized symbology is received from an external device or system that stores and/or generates the unique serialized symbology. For example, in some embodiments, the apparatus 200 receives the unique serialized symbology from a system controlled by a particular manufacturer corresponding to a trusted symbology user account.

At operation 710, the apparatus 200 includes trust network validation circuitry 210, data maintenance circuitry 212, symbology generation circuitry 214, communications circuitry 208, input/output circuitry 206, processor 202, and/or the like, or a combination thereof, that pushes object information associated with the unique serialized symbology to a trust database of a serialization trust network processing service. In some embodiments, the serialization trust network processing service is embodied by and/or controlled by the serialization trust network processing service. The trust database in some embodiments maintains identifier(s) and/or data associated with the unique serialized symbology, for example a unique object-linked identifier encoded into a unique serialized symbology and/or object information of an object corresponding to the unique serialized symbology or unique object-linked identifier encoded thereby. In this regard, the trust database embodies a central source of truth for data associated with unique serialized symbologies and/or objects corresponding to said unique serialized symbologies.

At optional operation 712, the apparatus 200 includes trust network validation circuitry 210, data maintenance circuitry 212, symbology generation circuitry 214, communications circuitry 208, input/output circuitry 206, processor 202, and/or the like, or a combination thereof, that prints unique serialized symbology and/or additional authentication features on an object or associated with an object. In some embodiments, the apparatus 200 initiates a printing process utilizing one or more peripheral(s) that print the unique serialized symbology onto an object corresponding to particular object information. In some such embodiments, the unique serialized symbology encodes a unique object-linked identifier corresponding to the object upon which the unique serialized symbology is printed. Alternatively or additionally, in some embodiments, the apparatus 200 prints additional authentication features on the object in addition to the unique serialized symbology. Alternatively or additionally, in some embodiments, the apparatus 200 prints the unique serialized symbology and/or additional authentication features onto packaging, a tag, or other supportive object associated with an object.

At operation 714, the apparatus 200 includes trust network validation circuitry 210, data maintenance circuitry 212, symbology generation circuitry 214, communications circuitry 208, input/output circuitry 206, processor 202, and/or the like, or a combination thereof, that initiates access to a serialization trust network processing service. In some embodiments, the apparatus 200 automatically initiates the trusted symbology user account utilized to generate the unique serialized symbology and/or push the unique serialized symbology to the serialization trust network processing service to access said serialization trust network processing service. Alternatively or additionally, in some embodiments, the apparatus 200 initiates the trusted symbology user account to access the serialization trust network processing service upon submission of a payment, subscription to the service, upon initiation of one or more data-driven trigger(s), and/or the like.

FIG. 8 illustrates an example flowchart depicting example operations of a process for generating a unique serialized symbology based at least in part on a user identifier in accordance with at least an example embodiment of the present disclosure. Specifically, FIG. 8 depicts an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a separate end user device, trusted symbology user device, and/or the like. For purposes of simplifying the description, the process 800 is described as performed by and from the perspective of the apparatus 200.

The process 800 begins at operation 802. In some embodiments, the process 800 begins after one or more operations depicted and/or described with respect to any one of the other processes described herein, for example after operation 702 of the process 700. In this regard, some or all of the process 800 may replace or supplement one or more blocks depicted and/or described with respect to any of the processes described herein. Upon completion of the process 800, the flow of operations may terminate. Additionally or alternatively, as depicted, upon completion of the process 800 in some embodiments, flow may return to one or more operation(s) of another process, such as the operation 704. It will be appreciated that, in some embodiments, the process 800 embodies a sub-process of one or more other process(es) depicted and/or described herein, for example the process 700.

At operation 802, the apparatus 200 includes trust network validation circuitry 210, data maintenance circuitry 212, symbology generation circuitry 214, communications circuitry 208, input/output circuitry 206, processor 202, and/or the like, or a combination thereof, that maintains a plurality of user identifiers. In some embodiments, the plurality of user identifiers is associated with a plurality of manufacturing locations, for example where each user identifier corresponds to a particular manufacturing location. Each manufacturing location in some embodiments is associated with manufacturing of an object, where the object is associated with or otherwise represented by a unique object-linked identifier. In this regard, in some embodiments, each user identifier corresponds to a particular trusted symbology user account, such that initiation of an authenticated session associated with the trusted symbology user account. In this regard, the user identifier may represent a particular location at which the object associated with the unique object-linked identifier is manufactured or otherwise produced.

At operation 804, the apparatus 200 includes trust network validation circuitry 210, data maintenance circuitry 212, symbology generation circuitry 214, communications circuitry 208, input/output circuitry 206, processor 202, and/or the like, or a combination thereof, that receives a request to generate the unique serialized symbology. In some embodiments, the request is associated with a particular user identifier of the plurality of user identifiers. In this regard, the particular user identifier may correspond to a particular authenticated trusted symbology user account for an authenticated session. In response to the request, the apparatus 200 may generate the unique serialized symbology utilizing the particular user identifier. For example, in some embodiments the unique object-linked identifier is generated utilizing a randomization algorithm based at least in part on the particular user identifier, or where the unique object-linked identifier is linked to the particular user identifier.

FIG. 9 illustrates an example flowchart depicting example operations of a process for providing serialization validation in a trust network in accordance with at least an example embodiment of the present disclosure. Specifically, FIG. 9 depicts an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a separate end user device, trusted symbology user device, and/or the like. For purposes of simplifying the description, the process 900 is described as performed by and from the perspective of the apparatus 200.

The process 900 begins at operation 902. In some embodiments, the process 900 begins after one or more operations depicted and/or described with respect to any one of the other processes described herein, for example after operation 714 of the process 700. In this regard, some or all of the process 900 may replace or supplement one or more blocks depicted and/or described with respect to any of the processes described herein. Upon completion of the process 900, the flow of operations may terminate. Additionally or alternatively, as depicted, upon completion of the process 900 in some embodiments, flow may return to one or more operation(s) of another process. It will be appreciated that, in some embodiments, the process 900 embodies a sub-process of one or more other process(es) depicted and/or described herein, for example the process 700.

At optional operation 902, the apparatus 200 includes trust network validation circuitry 210, data maintenance circuitry 212, symbology generation circuitry 214, communications circuitry 208, input/output circuitry 206, processor 202, and/or the like, or a combination thereof, that receives object information associated with a unique serialized symbology. The object information in some embodiments includes physical characteristics of a corresponding object that can be utilized to validate authenticity of a particular object as a validated object instance or a counterfeit object instance, including and without limitation an object color, an object size, an object pattern, an image of the object, and/or the like. In some embodiments, the apparatus 200 receives the object information in response to user input. For example, in some embodiments, the apparatus 200 receives the object information transmitted from a trusted symbology user device associated with an authenticated session.

At operation 904, the apparatus 200 includes trust network validation circuitry 210, data maintenance circuitry 212, symbology generation circuitry 214, communications circuitry 208, input/output circuitry 206, processor 202, and/or the like, or a combination thereof, that stores object information associated with unique serialized symbology in a trust database. In some embodiments, the trust database includes one or more repository/repositories maintained by the apparatus 200. In some embodiments, the trust database stores data corresponding to a key embodied by or including at least a unique object-linked identifier. Additionally or alternatively, in some embodiments the apparatus 200 stores a representation of the unique serialized symbology corresponding to such object information, for example linked to a unique object-linked identifier, in the trust database for subsequent retrieval.

At operation 906, the apparatus 200 includes trust network validation circuitry 210, data maintenance circuitry 212, symbology generation circuitry 214, communications circuitry 208, input/output circuitry 206, processor 202, and/or the like, or a combination thereof, that receives an indication of a scan of a captured symbology. The scan may embody a captured image representation of a particular machine-readable symbology to be processed as a unique serialized symbology. In some embodiments, the apparatus 200 receives the indication of the scan of the captured symbology from an end user device and via a serialization processing portal. The serialization processing portal in some embodiments comprises a web portal accessible to the end user device via a browser application. In this regard, the end user device may be able to access the serialization processing portal without requiring any specialized application be installed on the end user device. In some embodiments, the apparatus 200 receives the indication of the scan of the captured symbology in response to scanning of the captured symbology via the end user device. For example, in some embodiments, the captured symbology encodes a web URL representing an endpoint to the serialization processing portal.

At optional operation 908, the apparatus 200 includes trust network validation circuitry 210, data maintenance circuitry 212, symbology generation circuitry 214, communications circuitry 208, input/output circuitry 206, processor 202, and/or the like, or a combination thereof, that automatically performs a validation of the scan of the captured symbology utilizing at least the trust database. In some embodiments, the validation determines at least whether the captured symbology represents the unique serialized symbology. For example, in some embodiments, the apparatus 200 performs image processing to validate one or more authentication elements visually detected within the captured symbology. Additionally or alternatively, in some embodiments, the apparatus 200 decodes the captured symbology to identify a particular identifier (e.g., corresponding to a unique object-linked identifier) represented therein. In some embodiments, the apparatus 200 queries the trust database utilizing the particular identifier to determine the particular authentication elements for validation. Additionally or alternatively, in some embodiments, the apparatus 200 retrieves object information based at least in part on the particular identifier decoded from the captured symbology, such that the object information may be compared (e.g., automatically by the apparatus 200 or via providing to the end user device for comparison by an end user of the end user device) with actual characteristics of a particular item in possession of the end user.

At operation 910, the apparatus 200 includes trust network validation circuitry 210, data maintenance circuitry 212, symbology generation circuitry 214, communications circuitry 208, input/output circuitry 206, processor 202, and/or the like, or a combination thereof, that provides, to the end user device, at least validation information. In some embodiments, the validation information includes object information associated with a particular unique object-linked identifier corresponding to the captured symbology embodying a unique serialized symbology. In this regard, the object information may include visual characteristics of the object that correspond to a validated object instance, for example for confirmation via the apparatus 200 and/or the end user associated with the end user device. In some embodiments, the validation information includes at least data indicating whether at least one validation was successful. For example, in some embodiments, the validation information includes at least one data value indicating whether a captured symbology was validated as embodying a unique serialized symbology, for example by validating expected authentication elements.

FIG. 10 illustrates an example flowchart depicting example operations of a process for outputting object information based at least in part on a scanned captured symbology in accordance with at least an example embodiment of the present disclosure. Specifically, FIG. 10 depicts an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a separate end user device, trusted symbology user device, and/or the like. For purposes of simplifying the description, the process 1000 is described as performed by and from the perspective of the apparatus 200.

The process 1000 begins at operation 1002. In some embodiments, the process 1000 begins after one or more operations depicted and/or described with respect to any one of the other processes described herein, for example after operation 908 of the process 900. In this regard, some or all of the process 1000 may replace or supplement one or more blocks depicted and/or described with respect to any of the processes described herein. Upon completion of the process 1000, the flow of operations may terminate. Additionally or alternatively, as depicted, upon completion of the process 1000 in some embodiments, flow may return to one or more operation(s) of another process. It will be appreciated that, in some embodiments, the process 1000 embodies a sub-process of one or more other process(es) depicted and/or described herein, for example the process 900.

At operation 1002, the apparatus 200 includes trust network validation circuitry 210, data maintenance circuitry 212, symbology generation circuitry 214, communications circuitry 208, input/output circuitry 206, processor 202, and/or the like, or a combination thereof, that automatically retrieves, from the trust database and via the serialization processing portal, object information. For example, in some embodiments, the apparatus 200 identifies a particular data identifier embodying a key to query for the object information corresponding to the data identifier. In this regard, a data identifier, for example a unique object-linked identifier, may be inputted via upload to the serialization processing portal for processing by the apparatus 200. In some embodiments, the object information corresponds to the unique serialized symbology in response to successful validation of the scan of a captured symbology embodying the unique serialized symbology.

At operation 1004, the apparatus 200 includes trust network validation circuitry 210, data maintenance circuitry 212, symbology generation circuitry 214, communications circuitry 208, input/output circuitry 206, processor 202, and/or the like, or a combination thereof, that outputs at least the object information to the end user device. In some embodiments, the apparatus 200 transmits a response transmission communicated to the end user device over one or more communications network(s). Additionally or alternatively, in some embodiments, the apparatus 200 causes rendering of the object information via a serialization processing portal in response to retrieval from the trust database.

FIG. 11 illustrates an example flowchart depicting example operations of a process for storing a counterfeit indication associated with a unique serialized symbology in accordance with at least an example embodiment of the present disclosure. Specifically, FIG. 11 depicts an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a separate end user device, trusted symbology user device, and/or the like. For purposes of simplifying the description, the process 1100 is described as performed by and from the perspective of the apparatus 200.

The process 1100 begins at operation 1102. In some embodiments, the process 1100 begins after one or more operations depicted and/or described with respect to any one of the other processes described herein, for example after operation 910 of the process 900. In this regard, some or all of the process 1100 may replace or supplement one or more blocks depicted and/or described with respect to any of the processes described herein. Upon completion of the process 1100, the flow of operations may terminate. Additionally or alternatively, as depicted, upon completion of the process 1100 in some embodiments, flow may return to one or more operation(s) of another process. It will be appreciated that, in some embodiments, the process 1100 embodies a sub-process of one or more other process(es) depicted and/or described herein, for example the process 900.

At operation 1102, the apparatus 200 includes trust network validation circuitry 210, data maintenance circuitry 212, symbology generation circuitry 214, communications circuitry 208, input/output circuitry 206, processor 202, and/or the like, or a combination thereof, that receives, via an end user device, user-provided information. In some embodiments, the object information is retrieved by the apparatus 200, for example from a trust database in response to scanning of a captured symbology and/or decoding of data represented therein, as described herein. In some embodiments, the user-provided information indicates whether an object in possession by a user of the end user device matches the object information provided associated with the unique serialized symbology. The user-provided information may indicate whether visual characteristics of an object in possession of the user matches expected visual characteristics represented in the object information provided. For example, in some embodiments the user-provided information includes a first data value in the circumstance where the object information matched visual characteristics of an object in possession of the end user (e.g., a "validated" data value), or the user-provided information represents a first data value includes a second data value in the circumstance where the object information did not match visual characteristics of the object in possession of the end user (e.g., a "counterfeit" data value)

At operation 1104, the apparatus 200 includes trust network validation circuitry 210, data maintenance circuitry 212, symbology generation circuitry 214, communications circuitry 208, input/output circuitry 206, processor 202, and/or the like, or a combination thereof, that stores a counterfeit indication based at least in part on the user-provided information. In some embodiments, the counterfeit indication embodies a first data value representing an unsuccessful validation of the object information corresponding to an object in possession by the end user of the end user device. For example, in some embodiments, the counterfeit indication is generated in response to user-provided information of a second data value indicating that the visual characteristics of the object in possession of the end user did not match one or more visual characteristics represented in the object information provided associated with the unique serialized symbology.

In some embodiments, the apparatus 200 stores a record embodying the counterfeit indication in one or more database(s), for example in some embodiments the trust database. The record, in some embodiments, includes data indicating that the validation of the object in possession was unsuccessful, trust network data associated with a scan corresponding to the user-provided information, and/or any additional information detectable and/or derivable associated with the scan, unique serialized symbology, and/or the like. For example, in some embodiments, the counterfeit indication includes or is stored associated with location data associated with the scan, a timestamp associated with the scan, user-provided information indicating what visual characteristics did not match, and/or user-provided response to additional inquiry request(s). In some embodiments, the counterfeit indication is stored as part of aggregated data associated with the unique serialized symbology. For example, in some embodiments, the apparatus 200 stores aggregated data indicating a number of unsuccessful scans corresponding to the unique serialized symbology.

FIG. 12 illustrates an example flowchart depicting example operations of a process for causing rendering of additional information request(s) associated with a counterfeit object in accordance with at least an example embodiment of the present disclosure. Specifically, FIG. 12 depicts an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a separate end user device, trusted symbology user device, and/or the like. For purposes of simplifying the description, the process 1200 is described as performed by and from the perspective of the apparatus 200.

The process 1200 begins at operation 1202. In some embodiments, the process 1200 begins after one or more operations depicted and/or described with respect to any one of the other processes described herein, for example after operation 1104 of the process 1100. In this regard, some or all of the process 1200 may replace or supplement one or more blocks depicted and/or described with respect to any of the processes described herein. Upon completion of the process 1200, the flow of operations may terminate. Additionally or alternatively, as depicted, upon completion of the process 1200 in some embodiments, flow may return to one or more operation(s) of another process. It will be appreciated that, in some embodiments, the process 1200 embodies a sub-process of one or more other process(es) depicted and/or described herein, for example the process 1100.

At operation 1202, the apparatus 200 includes trust network validation circuitry 210, data maintenance circuitry 212, symbology generation circuitry 214, communications circuitry 208, input/output circuitry 206, processor 202, and/or the like, or a combination thereof, that generates at least one additional information request. In some embodiments, the additional information request(s) embody or include informational prompts for data associated with the object in possession of the end user, data associated with a transaction associated with the object in possession (e.g., what the end user is seeking to do with the object, why the user is scanning the captured symbology associated with the object, and/or the like). It will be appreciated that the apparatus 200 may be configured to generate any desired at least one additional information request. In some embodiments, the apparatus 200 generates the at least one additional information request in response to detecting that the scan is associated with a counterfeit object instance. For example, in some embodiments, the apparatus 200 generates the at least one additional information request in response to, and/or otherwise based at least in part on, the user-provided information at operation 1102.

At operation 1204, the apparatus 200 includes trust network validation circuitry 210, data maintenance circuitry 212, symbology generation circuitry 214, communications circuitry 208, input/output circuitry 206, processor 202, and/or the like, or a combination thereof, that causes rendering of the at least one additional information request to the end user device. In some embodiments, the apparatus 200 causes rendering of the at least one additional information request via a serialization processing portal accessed via the end user device. For example, in some embodiments the apparatus 200 transmits response transmission(s) to the end user device that causes the end user device to render the at least one additional information request to the serialization processing portal.

At optional operation 1206, the apparatus 200 includes trust network validation circuitry 210, data maintenance circuitry 212, symbology generation circuitry 214, communications circuitry 208, input/output circuitry 206, processor 202, and/or the like, or a combination thereof, that receives trust network data in response to the at least one additional information request. In some embodiments, the trust network data includes user-provided information responding to the at least one additional information request. For example, in some embodiments, the trust network data includes user-provided information embodying what the user is seeking to do with the object, why the user is scanning the captured symbology associated with the object, and/or the like. Alternatively or alternatively, in some embodiments, the apparatus 200 receives trust network data embodying detected, derived, and/or other determined data from the end user device at the time that the scan was performed, the time that the additional information request was transmitted, and/or the like.

At optional operation 1208, the apparatus 200 includes trust network validation circuitry 210, data maintenance circuitry 212, symbology generation circuitry 214, communications circuitry 208, input/output circuitry 206, processor 202, and/or the like, or a combination thereof, that stores at least the trust network data. In some embodiments, the apparatus 200 stores the trust network data in at least one database, for example a trust database. In some embodiments, the apparatus 200 stores at least the trust network data corresponding to a unique object-linked identifier associated with or otherwise represented in a particular captured symbology, for example embodying a unique serialized symbology. In some embodiments, the apparatus 200 stores at least aggregated data based at least in part on the trust network data.

FIG. 13 illustrates an example flowchart depicting example operations of a process for storing and/or rendering aggregated data in accordance with at least an example embodiment of the present disclosure. Specifically, FIG. 13 depicts an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a separate end user device, trusted symbology user device, and/or the like. For purposes of simplifying the description, the process 1300 is described as performed by and from the perspective of the apparatus 200.

The process 1300 begins at operation 1302. In some embodiments, the process 1300 begins after one or more operations depicted and/or described with respect to any one of the other processes described herein, for example after operation 910 of the process 900. In this regard, some or all of the process 1300 may replace or supplement one or more blocks depicted and/or described with respect to any of the processes described herein. Upon completion of the process 1300, the flow of operations may terminate. Additionally or alternatively, as depicted, upon completion of the process 1300 in some embodiments, flow may return to one or more operation(s) of another process. It will be appreciated that, in some embodiments, the process 1300 embodies a sub-process of one or more other process(es) depicted and/or described herein, for example the process 900.

At operation 1302, the apparatus 200 includes trust network validation circuitry 210, data maintenance circuitry 212, symbology generation circuitry 214, communications circuitry 208, input/output circuitry 206, processor 202, and/or the like, or a combination thereof, that identifies trust network data associated with the scan. In some embodiments, the apparatus 200 identifies the trust network data automatically, for example by deriving and/or otherwise determining such trust network data in response to receiving the scan from the end user device. Such trust network data may include a timestamp associated with the scan, location data of the end user device, and/or the like. Additionally or alternatively, in some embodiments, the apparatus 200 identifies the trust network data from at least one request and/or transmission received from the end user device, for example including location data, timestamp data, and/or the like associated with the scan as received from the end user device.

At operation 1304, the apparatus 200 includes trust network validation circuitry 210, data maintenance circuitry 212, symbology generation circuitry 214, communications circuitry 208, input/output circuitry 206, processor 202, and/or the like, or a combination thereof, that stores aggregated data associated with at least one data identifier based at least in part on the trust network data. In some embodiments, the apparatus 200 stores the aggregated data in a trust database. In some embodiments, for example, the apparatus 200 stores aggregated data that represents a number of scan attempts performed at a particular location, within a particular region, at a particular time, and/or associated with a particular unique object-linked identifier. For example in some embodiments, the apparatus 200 generates aggregated data embodying a number of indications of scans performed for a particular unique object-linked identifier represented by a unique serialized symbology that were successful and/or a number of indications of scans performed for the particular unique object-linked identifier represented by the unique serialized symbology that were unsuccessful. It will be appreciated that the apparatus 200 may generate aggregated data representing any data values combined from or associated with a number of indications of scans.

At optional operation 1306, the apparatus 200 includes trust network validation circuitry 210, data maintenance circuitry 212, symbology generation circuitry 214, communications circuitry 208, input/output circuitry 206, processor 202, and/or the like, or a combination thereof, that receives, via a serialization processing portal, a request for aggregated data. In some embodiments, the apparatus 200 is received from a trusted symbology user device associated with a particular authenticated user account. In some embodiments, the trusted symbology user device transmits the request via the serialization processing portal associated with a particular unique object-linked data identifier and/or unique serialized symbology associated therewith. For example, a user associated with the trusted symbology user device in some embodiments selects an object, unique object-linked identifier, and/or unique serialized symbology for which the user would like to view data associated with, for example including or embodying the aggregated data.

At optional operation 1308, the apparatus 200 includes trust network validation circuitry 210, data maintenance circuitry 212, symbology generation circuitry 214, communications circuitry 208, input/output circuitry 206, processor 202, and/or the like, or a combination thereof, that causes rendering, via the serialization processing portal, of the aggregated data. In some embodiments, the apparatus 200 retrieves the aggregated data based at least in part on the request for aggregated data. In some embodiments, the apparatus 200 queries a trust database based at least in part on the request, for example utilizing one or more data identifier(s) extracted or otherwise parsed from the request. Additionally or alternatively, in some embodiments, the apparatus 200 transmits one or more response transmissions including the retrieved aggregated data to the trusted symbology user device. In some such embodiments, the trusted symbology user device renders the aggregated data to the serialization processing portal in response to receiving the response transmissions.

Conclusion

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks.

However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for providing serialization validation in a trust network, the apparatus comprising at least one processor and at least one non-transitory memory including computer-coded instructions thereon, the computer-coded instructions, with the at least one processor, cause the apparatus to:

maintain a plurality of user identifiers associated with a plurality of manufacturing locations that are associated with manufacturing of an object associated with a unique object-linked identifier;

receive a request to generate a unique serialized symbology, the request associated with a particular user identifier of the plurality of user identifiers, wherein the particular user identifier is utilized to generate at least one of the unique object-linked identifier or object information associated with the unique serialized symbology store the object information in a trust database, the object information comprising at least the unique object-linked identifier associated with the unique serialized symbology;

receive, from an end user device and via a serialization processing portal, an indication of a scan of a captured symbology;

automatically perform a validation of the scan of the captured symbology utilizing at least the trust database, wherein the validation at least determines whether the captured symbology represents the unique serialized symbology; and provide, to the end user device, at least validation information indicating whether the validation was successful.

2. The apparatus of claim 1, the apparatus further caused to:

generate the unique serialized symbology associated with a particular security level, wherein the unique serialized symbology represents the unique object-linked identifier, wherein the unique serialized symbology is associated with the object information including the unique object-linked identifier, wherein the unique serialized symbology is configured to trigger access to the serialization processing portal upon being scanned; and push the object information to the trust database in response to generation of the unique serialized symbology.

3. The apparatus of claim 1, the apparatus further caused to:

provide the unique serialized symbology to a system, wherein providing the unique serialized symbology cause the system to print the unique serialized symbology on a first object or on a second object affixed to the first object.

4. The apparatus of claim 1, the apparatus further caused to:

automatically retrieve, from the trust database and via the serialization processing portal, the object information corresponding to the unique serialized symbology in response to successfully validating the scan; and output at least the object information to the end user device.

5. The apparatus of claim 1, wherein the object information corresponding to the unique serialized symbology comprises an image of an object to which the unique serialized symbology is linked.

6. The apparatus of claim 1, the object information corresponding to the unique serialized symbology comprising manufacturing information corresponding to an object associated with the object information.

7. The apparatus of claim 1, the unique serialized symbology embodies a nested symbology that comprising a first symbology representing data utilized to access the serialization processing portal and a second symbology representing a scanned identifier associated with the scanned symbology, wherein the scanned identifier is transmitted to the serialization processing portal.

8. The apparatus of claim 1, the apparatus further caused to:

receive, via the end user device, user-provided information indicating whether an object in possession by a user of the end user device matches the object information provided associated with the unique serialized symbology; and store a counterfeit indication based at least in part on the user-provided information.

9. The apparatus of claim 1, the apparatus further caused to:

in a circumstance where the validation of the scan indicates a counterfeit object instance, generate aggregated data based at least in part on trust network data associated with the scan, the aggregated data associated with at least one data value indicating the scan is associated with a counterfeit object instance.

10. The apparatus of claim 9, the apparatus further caused to:

cause rendering, via the serialization processing portal, of the aggregated data to a trusted symbology user device associated with at least the counterfeit object instance.

11. The apparatus of claim 9, the apparatus further caused to:

generate at least one additional information request in response to detecting that the scan is associated with the counterfeit object; and cause rendering of the at least one additional information request to the end user device.

12. The apparatus of claim 1, the apparatus further caused to:

in a circumstance where the validation of the scan indicates an validated object instance of, generate aggregated data based at least in part on trust network data associated with the scan, the aggregated data associated with at least one data value indicating the scan is associated with the validated object instance.

13. The apparatus of claim 12, the apparatus further caused to:

cause rendering, via the serialization processing portal, of the aggregated data to a trusted symbology user device associated with at least the validated object instance.

14. The apparatus of claim 1, wherein the unique serialized symbology is associated with a particular security level selected from a plurality of candidate security levels, wherein the validation of the scan is based at least in part on the particular security level, and wherein the unique serialized symbology includes additional authentication elements for each higher-level security level of the plurality of candidate security levels.

15. The apparatus of claim 14, wherein the plurality of candidate security levels comprises:

(1) a first security level associated with a first symbology implementation, (2) a second security level associated with a second symbology implementation comprising at least one first additional authentication element not present in the first symbology implementation, wherein the at least one first additional authentication element comprises a customized code design, and (3) a third security level associated with a third symbology implementation comprising at least one second additional authentication element not present in the first symbology implementation and not present in the second symbology implementation, wherein the at least one second additional authentication element comprises a custom packaging authentication element.

16. The apparatus of claim 1, wherein the unique serialized symbology is scannable using a camera application installed on the end user device, wherein the camera application is distinct from a user-facing application corresponding to the serialization processing portal.

17. The apparatus of claim 1, wherein the unique serialized symbology is scannable using a user-facing application corresponding to the serialized processing portal, wherein the user-facing application is installed on the end user device during scanning.

18. A computer-implemented method comprising:

maintaining a plurality of user identifiers associated with a plurality of manufacturing locations that are associated with manufacturing of an object associated with a unique object-linked identifier;

receiving a request to generate a unique serialized symbology, the request associated with a particular user identifier of the plurality of user identifiers, wherein the particular user identifier is utilized to generate at least one of the unique object-linked identifier or object information associated with the unique serialized symbology storing the object information in a trust database, the object information comprising at least the unique object-linked identifier associated with the unique serialized symbology;

receiving, from an end user device and via a serialization processing portal, an indication of a scan of a captured symbology;

automatically performing a validation of the scan of the captured symbology utilizing at least the trust database, wherein the validation determines whether the captured symbology represents the unique serialized symbology; and providing, to the end user device, at least validation information indicating whether the validation was successful.

19. A computer program product comprising at least one non-transitory computer-readable storage medium having computer program code stored thereon that, in execution with at least one processor, configures the computer program product to:

maintain a plurality of user identifiers associated with a plurality of manufacturing locations that are associated with manufacturing of an object associated with a unique object-linked identifier;

receive a request to generate a unique serialized symbology, the request associated with a particular user identifier of the plurality of user identifiers, wherein the particular user identifier is utilized to generate at least one of the unique object-linked identifier or object information associated with the unique serialized symbology store the object information in a trust database, the object information comprising at least the unique object-linked identifier associated with the unique serialized symbology;

receive, from an end user device and via a serialization processing portal, an indication of a scan of a captured symbology;

automatically perform a validation of the scan of the captured symbology utilizing at least the trust database, wherein the validation determines whether the captured symbology represents the unique serialized symbology; and provide, to the end user device, at least validation information indicating whether the validation was successful.

* * * * *